US008352754B2

(12) United States Patent
Chin

(10) Patent No.: US 8,352,754 B2
(45) Date of Patent: Jan. 8, 2013

(54) POWER MANAGEMENT OF POE DEVICES BASED ON POWERED QUEUE AND UNPOWERED QUEUE OF TIME ORDER CONNECTION PRIORITY WHILE MAINTAINING RESERVE POWER

(75) Inventor: David Kun Chin, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 950 days.

(21) Appl. No.: 11/979,919

(22) Filed: Nov. 9, 2007

(65) Prior Publication Data

US 2008/0114997 A1    May 15, 2008

Related U.S. Application Data

(60) Provisional application No. 60/858,937, filed on Nov. 15, 2006.

(51) Int. Cl.
*G06F 1/26*        (2006.01)
(52) U.S. Cl. ................................. 713/300; 713/323
(58) Field of Classification Search ............... None
See application file for complete search history.

(56) References Cited

U.S. PATENT DOCUMENTS

| | | | | |
|---|---|---|---|---|
| 6,545,775 B1 * | 4/2003 | Watanabe et al. | ............ | 358/442 |
| 6,618,811 B1 * | 9/2003 | Berthaud et al. | ............. | 713/300 |
| 7,337,336 B2 * | 2/2008 | Ferentz et al. | ............... | 713/300 |
| 7,340,325 B2 * | 3/2008 | Sousa et al. | .................. | 700/295 |
| 7,441,133 B2 * | 10/2008 | Giat et al. | .................... | 713/300 |
| 7,814,340 B2 * | 10/2010 | Heath et al. | .................. | 713/300 |
| 7,895,456 B2 * | 2/2011 | Ferentz et al. | ............... | 713/300 |
| 2003/0135767 A1 * | 7/2003 | Chu et al. | ..................... | 713/300 |
| 2007/0277049 A1 * | 11/2007 | Hansalia | ...................... | 713/321 |

* cited by examiner

*Primary Examiner* — Kenneth Kim
(74) *Attorney, Agent, or Firm* — Sterne, Kessler, Goldstein & Fox PLLC

(57) ABSTRACT

In a communications system, such as a Power-Over-Ethernet system, where power supply equipment (PSE) supplies power to powered requiring devices (PRDs), a system and method of dynamic power management is implemented. The system and method monitors the power consumed at each port by the PRDs. Based on this monitoring, the PSE dynamically determines the minimum power which can be allocated to each PRD, and so dynamically maximizes the available reserve power. The PSE maintains a queue or queues wherein PRDs are listed in order of a power allocation priority. When additional power is available, the PSE preferentially allocates power to a PRD or PRDs which have higher priority. The system and method of the present invention minimizes the power allocated to each individual network device, as a result of which the total number of network devices that can be supported with the available power may be maximized.

21 Claims, 12 Drawing Sheets

PRD Queues

POWER MANAGEMENT OF POE DEVICES BASED ON POWERED QUEUE AND UNPOWERED QUEUE OF TIME ORDER CONNECTION PRIORITY WHILE MAINTAINING RESERVE POWER

CROSS REFERENCE TO RELATED APPLICATIONS

This patent application claims the benefit of U.S. Provisional Patent Application No. 60/858,937, filed Nov. 15, 2006, entitled "System And Method Of Dynamic Power Management," which is incorporated herein by reference in its entirety.

BACKGROUND OF THE INVENTION

1. Field of the Invention

The present invention pertains to the field of providing power from power source equipment (PSE) to one or more devices which are part of a communications system or communications network, and to managing the power which is supplied to the networked devices.

2. Background Art

Network devices which require power are conventionally referred to in the art as "powered devices", or "PDs" for short. In this document, for reasons explained further below, such devices will be referred to as "power requiring devices", or "PRDs", wherein the terms "power requiring device", "PRD", and the plurals thereof are entirely synonymous with the terms "powered device", "PD", and the plurals thereof, as conventionally employed in the art.

Conventionally, in a communications system, such as a network environment where cabling is employed to provide power to PRDs, at least two separate cables are connected to each PRD. One PRD cable conveys data to and from the (data communications equipment (DCE), while a second cable supplies each PRD with power from a power supply which is typically separate from the DCE. The disadvantages of this approach have long been obvious. Using two cables increases the physical bulk of cabling which must be wired through the physical environment, demanding more space and making it more difficult to track which cables are serving which functions. If power is supplied to a PRD via a local power outlet, for example, a standard wall outlet, then it may be necessary to locate a separate uninterruptible power supply (UPS) near many or all of the PRDs. As a result, multiple UPS may be required. Some PRDs have required transformers co-located with the PRD, further increasing bulk and complicating deployment efforts. Overall, dual cable solutions typically cost more than a single cable solution and tend to be unwieldy to deploy and maintain.

In addition, a key limitation of dual cable solutions is that they inherently tend to exclude the transmission of data which is related to the power consumption of a PRD. For example, if a PRD is plugged directly into a wall socket, or connected to a wall socket via a dedicated UPS or transformer, there typically does not exist any means to monitor the power delivered to the PRD, nor to regulate the power delivered to the PRD. In turn, this makes it difficult to monitor and control overall network power consumption.

A single cable solution, wherein the single cable carries both data and power, has long been known in certain fields. For example, the cabling employed by the plain old telephone system (POTS) network carries both power and data. Other technologies, such as USB communications systems and IEEE 1392 ("Firewire") systems, typically are capable of supporting both data and power transmission on a single cable. The advantages of single cable solutions are obvious: Lower cost, half as many wires to be tracked and untangled, and, if all the cables extend from a single DCE, then a single UPS can provide power support to all the network devices via the DCE. Furthermore, single cable solutions are inherently more friendly to technology which monitors and regulates power consumption by the PRDs, since the power cable is already designed to support data transmission as well.

A problem has existed, however, in adapting certain widely used legacy technologies to take advantage of single cable power and data solutions. In particular, Ethernet communications systems, which are widely deployed for wired computer networks worldwide, have long relied on one cable (the Ethernet cable) to carry data to PRDs and another separate cable to supply power to the PRDs, with all the disadvantages already noted above.

Recently a solution has emerged to enable Ethernet networks to take advantage of single cable data and power solutions. Specifically, the IEEE 802.3af protocol defines standards wherein power can be carried to PRDs from a DCE, such as an Ethernet switch, over the same industry-standard Ethernet cabling and Ethernet connectors (i.e., the RJ-45 plug and jack) that formerly was used to carry only data. As a result, where it was formerly necessary to employ a separate source of power to deliver power to PRDs, the power source equipment (PSE) can now be integrated into the DCE itself. Newly designed PRDs, such as wireless access points (WAPs) for 802.11 and Bluetooth devices, web cameras, IP telephones, security access devices, point-of-service (POS) terminals, and similar technologies are designed to accept power directly over the Ethernet cabling, dramatically simplifying deployment of network devices.

The IEEE 802.3af standard is also referred to as the "Power Over Ethernet" standard, or "PoE", and the terms "802.3af" and "PoE" are used interchangeably in this document, along with such terms as "802.3af-compliant", "PoE-compliant", and related terminology.

An advantage of PoE is that a PoE-compliant PSE, or PoE PSE for short, can detect the presence of legacy Ethernet devices which are not designed to accept power over the Ethernet cable, and so not deliver power to such devices. This makes it possible to support both PoE-compliant PRDs and legacy PRDs in the same network. Additionally, legacy Ethernet switches, which are not PoE-compliant, can be used with the newer PoE-compliant PRDs. This is done by inserting, between the legacy Ethernet switch and the PRDs, a so-called "mid-span" PSE, also referred to as a PoE mid-span hub. The PoE mid-span hub accepts the Ethernet cabling from the Ethernet switch, and loads the power onto Ethernet cables which extend from the PoE hub to the PRDs. When data is received from the PRDs, the mid-span PoE hub passes the signals on to the Ethernet switch.

A further advantage of the IEEE 802.3af standard is that PoE-compliant PRDs can have an embedded management information base (MIB), which contains data on the power requirements of the device as determined by the device manufacturer. Specifically, 802.3af-compliant PRDs can be classified at power levels designated as '1', '2', or '3', which respectively indicate increasing power requirements. (A default '0' value encompasses all three power levels. A fifth designation, '4', is currently reserved for future use.) The PoE PSE can read the power classification from a PoE PRD via the Ethernet connection. This enables the PoE PSE to allocate only the designated amount of power to a PRD, which conserves power for other attached devices and contributes to the general goal of efficient power utilization. Yet another advantage of combining data signaling and power delivery over a single cable is that PRDs can be shut down remotely, via control signals sent from the DCE, without the need for a power switch or reset button.

In summary, PoE technology, and similar protocols which may be employed in the context of other kinds of communications links such as USB and Firewire, enable power to be carried over the same cable that is used for data transmission. These technologies further enable intelligent management by DCEs of the power consumption by PRDs.

In spite of the improvements in network power allocation and power management that have come with 802.3af and similar protocols, shortcomings remain. One problem is that, in real-world operation, PRDs often use significantly less power than the maximum power they might request. For example, an 802.3af-compliant PRD might classify itself in Class 2, meaning that the DCE should be able to deliver 7.0 watts to the port to which the PRD is connected, and therefore that at least 7.0 watts should be held in reserve by the DCE to support the Class 2 PRD. However, in actual use, the PRD might never use anywhere near this much power, or possibly the PRD might draw near the maximum power at infrequent intervals, while using dramatically less power most of the time. This might be the case, for example, with a wireless access point that has a light load of wireless devices associated with it.

In addition, it is not always a requirement of the standards that a device provide any power classification. For example, PoE devices are not required to provide a power classification. As a result, when a PoE-compliant PRD is connected to the DCE, and the PRD does not report any power classification, by default the DCE may allocate or reserve the maximum allowed power under the 802.3af protocol, namely 15.4 watts, to the port to which the PRD is connected. This will be the case even if the PRD never actually consumes anywhere near 15.4 watts.

As a result of these factors, the actual power allocated to PRDs, or held in reserve by the DCE to support the PRDs, may be well in excess of the amount of power that these devices actually require to support their operation. If many devices are connected to the DCE, a further result may be that insufficient power is available to power all the devices, leaving some devices effectively non-operational. It is desirable, then, that a means be found to ensure that the minimum possible power is allocated to each PRD, while still ensuring full functionality of each PRD. In turn, this will ensure that the number of PRDs which may actually be allocated power tends to be maximized, while still minimizing overall power consumption.

A further short-coming of existing power technologies is that they provide no way to prioritize attached network devices. That is to say, if insufficient power is available to support the operations of all PRDs attached to the DCE, it may be desirable that some specific PRDs have a higher priority for power allocation than other PRDs. The exact choice of which PRDs should have higher priority will naturally depend on many factors specific to the nature of the network, the usage being made of the network devices, and the specific requirements of a company or other enterprise implementing the network.

Therefore, it is desirable that means be provided so that network engineers can indicate a priority among network devices, such that if insufficient power is available to power all PRDs connected to the DCE, then those PRDs assigned the highest priority are preferentially allocated power ahead of lower priority PRDs whenever possible. It is further desirable that network engineers be provided the maximum possible flexibility in determining the criteria which are used to assign power allocation priority levels to PRDs.

A further shortcoming of present technologies is that, in the event of a sudden decrease in available power, no method is provided to deallocate power from the PRDs. It is desirable that, in the event of an unexpected decrease in available power, a means exist to deallocate power from some of the PRDs, preferably in an order which reflects some kind of priority among the attached PRDs, where that priority may or may not be the same priority used to assign power to the PRDs to begin with.

Given the foregoing, what is needed is a system and method of improved, dynamic power management and allocation for power requiring devices which are part of a communications system or communications network.

In particular, what is needed is a system and method of dynamic power management and allocation for determining the actual power consumption of power requiring devices which are part of the communications system, and adjusting the power allocation so that the minimum necessary power is allocated to power requiring devices which are part of the communications system. What is further needed is a system and method of dynamic power management and allocation for determining a priority among power requiring devices which are part of the communications system, and for ensuring that whenever possible power requiring devices of a higher prior are preferentially allocated power ahead of power requiring devices of a lower priority.

BRIEF SUMMARY OF THE INVENTION

The present invention meets the above-identified needs by providing a system and method for dynamic management in a communications system or communications network. In an exemplary embodiment, the present invention may be employed as part of a data communications equipment (DCE) device, such as a network switch, wherein the DCE is also the PSE and wherein multiple network devices are powered via the PSE. The PSE may have a plurality of communications ports and a plurality of PRDs which transmit and receive data over the ports, and receive power via the ports. The PSE monitors the power consumed at each port by those PRDs which are currently powered.

Based on the power monitoring, the PSE dynamically determines the minimum power which should be allocated to each PRD, and so dynamically determines the amount of reserve power available. The PSE also maintains a listing, possibly in the form of a PRD queue or queues, which indicates the priority of PRDs. When additional power is available to be allocated, the PSE preferentially allocates power to a PRD or PRDs which have higher priority. If a decrease in available power mandates that some currently powered PRDs no longer receive power, the PSE preferentially ensures that PRDs with a higher priority continue to receive power.

The method of the present invention thus provides dynamic power management, wherein the power allocated to each individual network device may be minimized, and wherein as a result the total number of network devices that can be supported with the available power may be maximized. One result may be a more efficient utilization of the available power.

BRIEF DESCRIPTION OF THE DRAWINGS/FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

Figure 2:
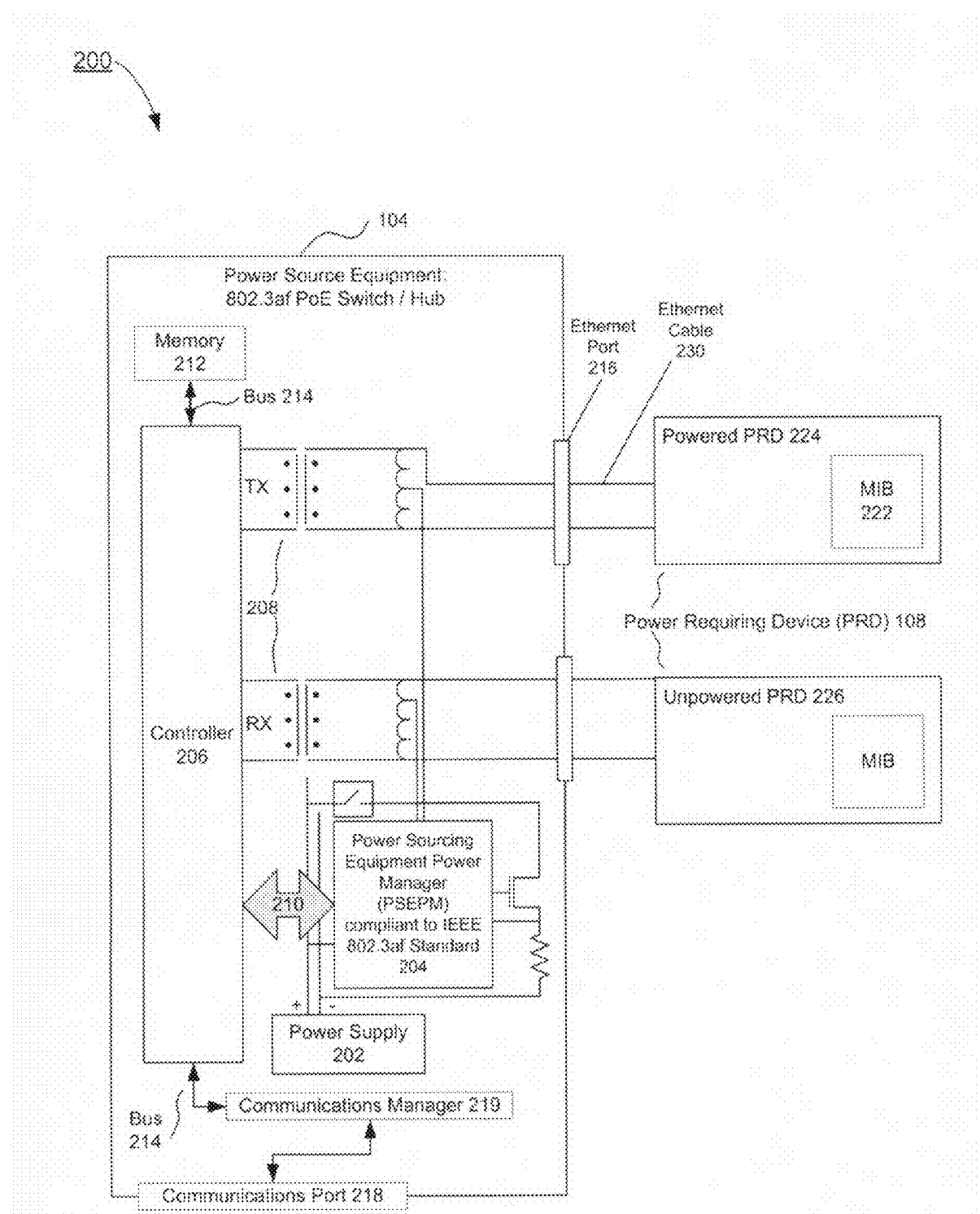

FIG. 2 contains block diagrams showing part of the internal structure of a representative communications system, specifically a PoE switch, which may be used in one embodiment of the present invention, and also showing part of the internal structure of a representative power requiring device. The figure also shows the connection between the PoE switch and the power requiring device.

Figure 3A:
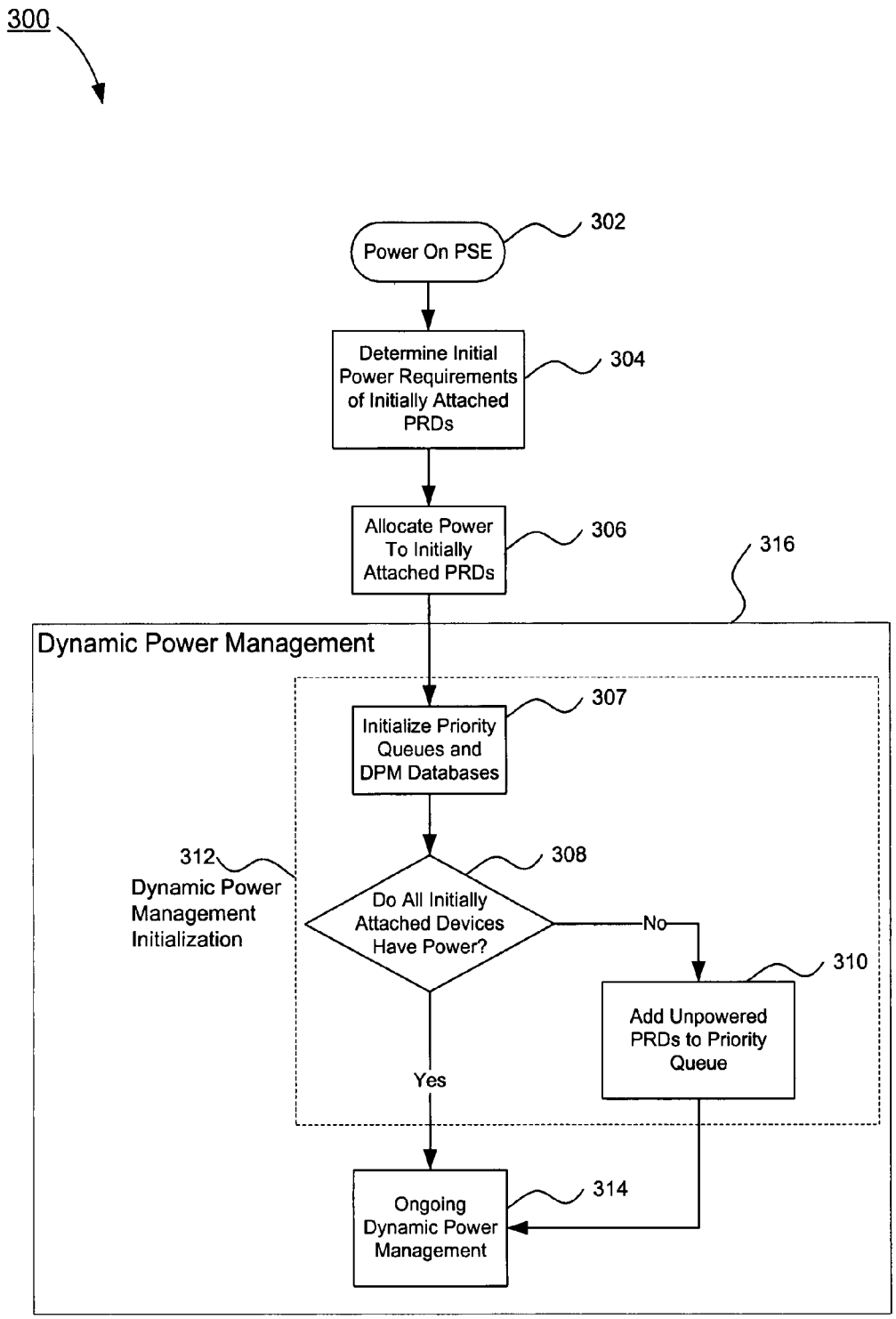

FIG. 3A illustrates a method according to one embodiment of the present invention, whereby a representative communications system and associated power requiring devices are initially powered on, and wherein the current method of dynamic power management of the present invention is initiated.

Figure 3B:
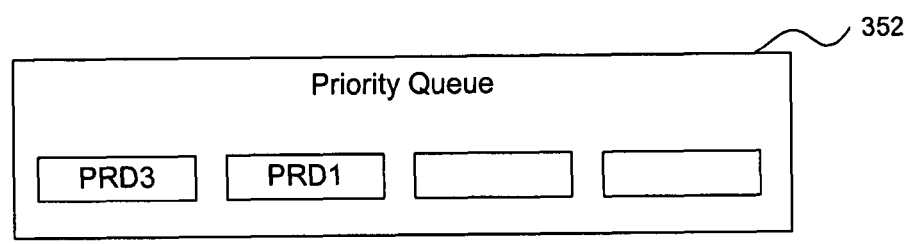
Figure 3B:
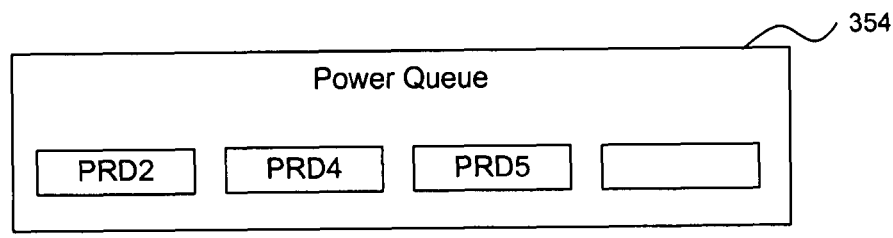

FIG. 3B is a representative depiction of several queues, specifically a priority queue and a power queue, and wherein the queues are employed in one embodiment of the present invention to store priority information on PRDs.

Figure 4A:
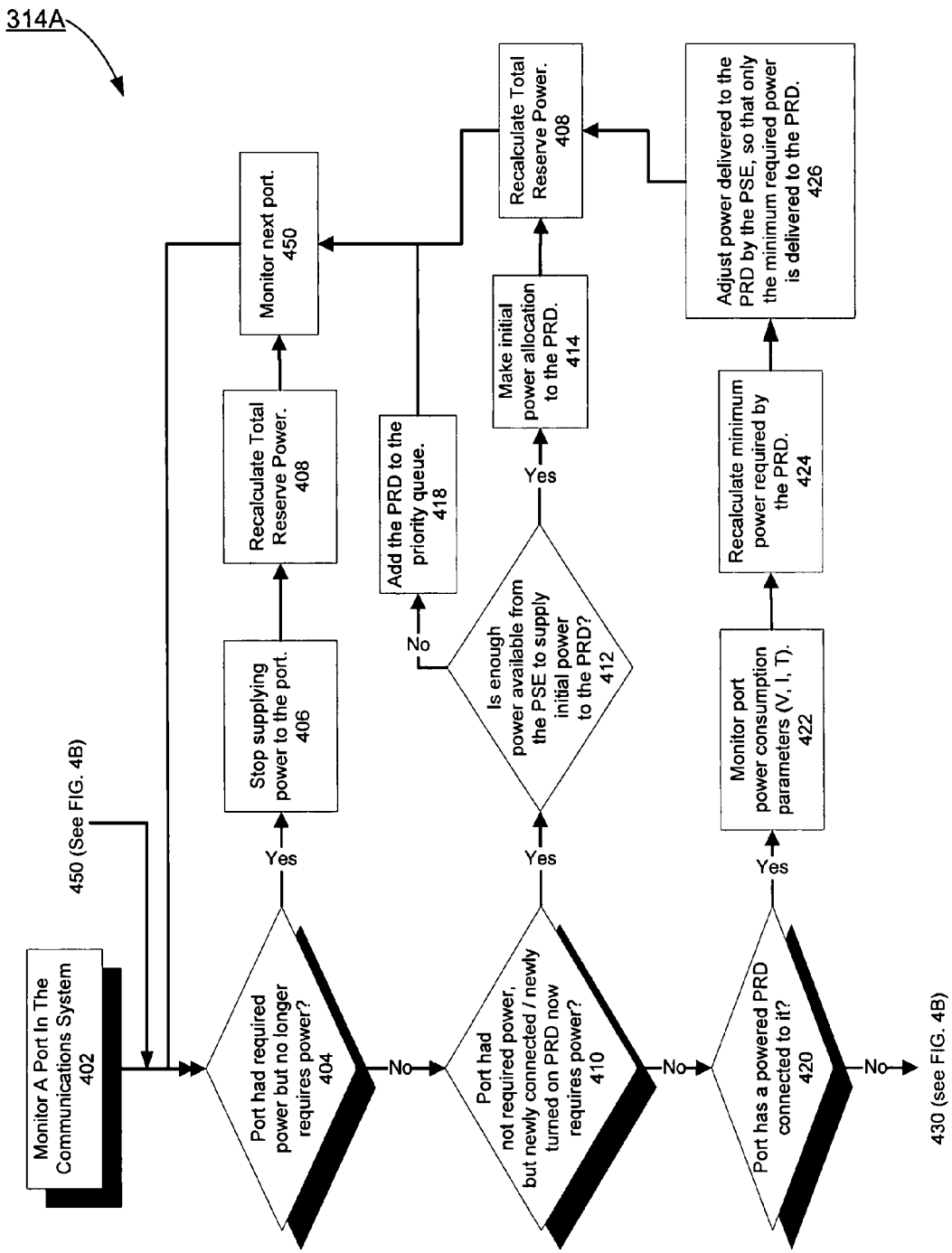
Figure 4B:
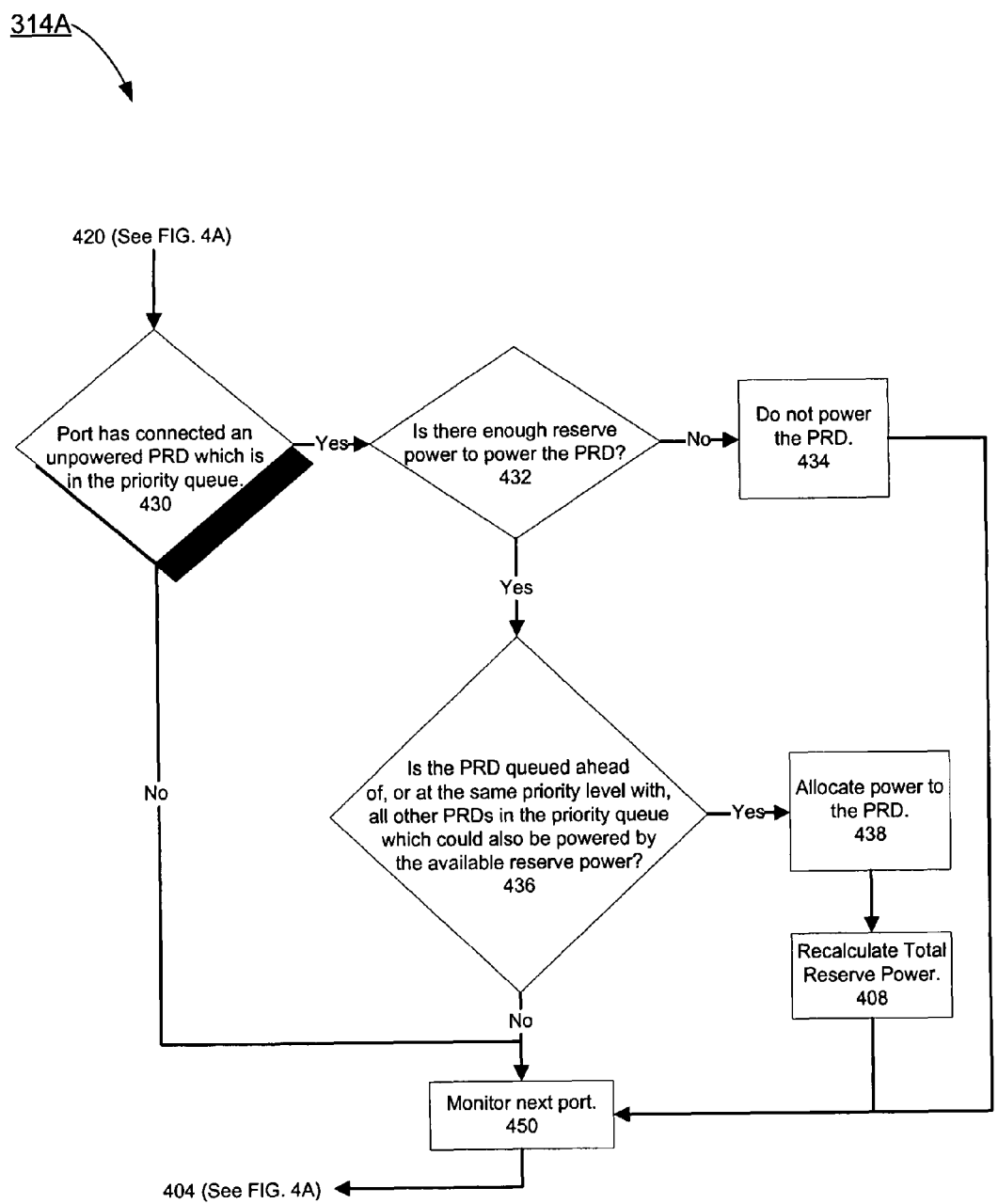

FIGS. 4A and 4B together present a flowchart illustrating one embodiment of a method of ongoing dynamic power management according to the present invention. The single flowchart has been split between two figures for ease of reading only, and embodies a unified method.

Figure 5:
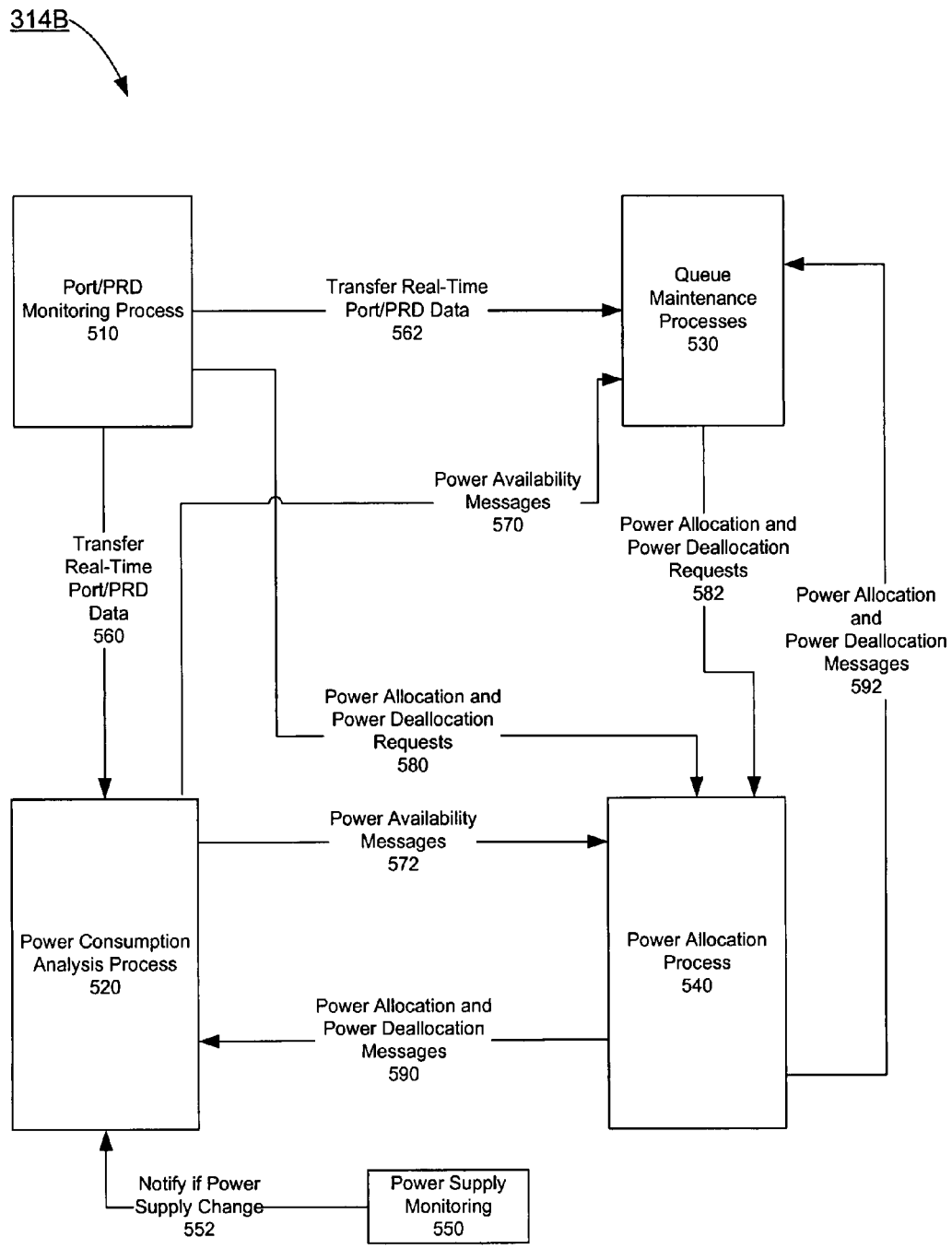

FIG. 5 presents another embodiment of a method of ongoing dynamic power management according to the present invention, wherein multiple monitoring, analysis, and control processes occur in parallel or substantially in parallel, and wherein these processes communicate with each other through a series of messages.

Figure 6:
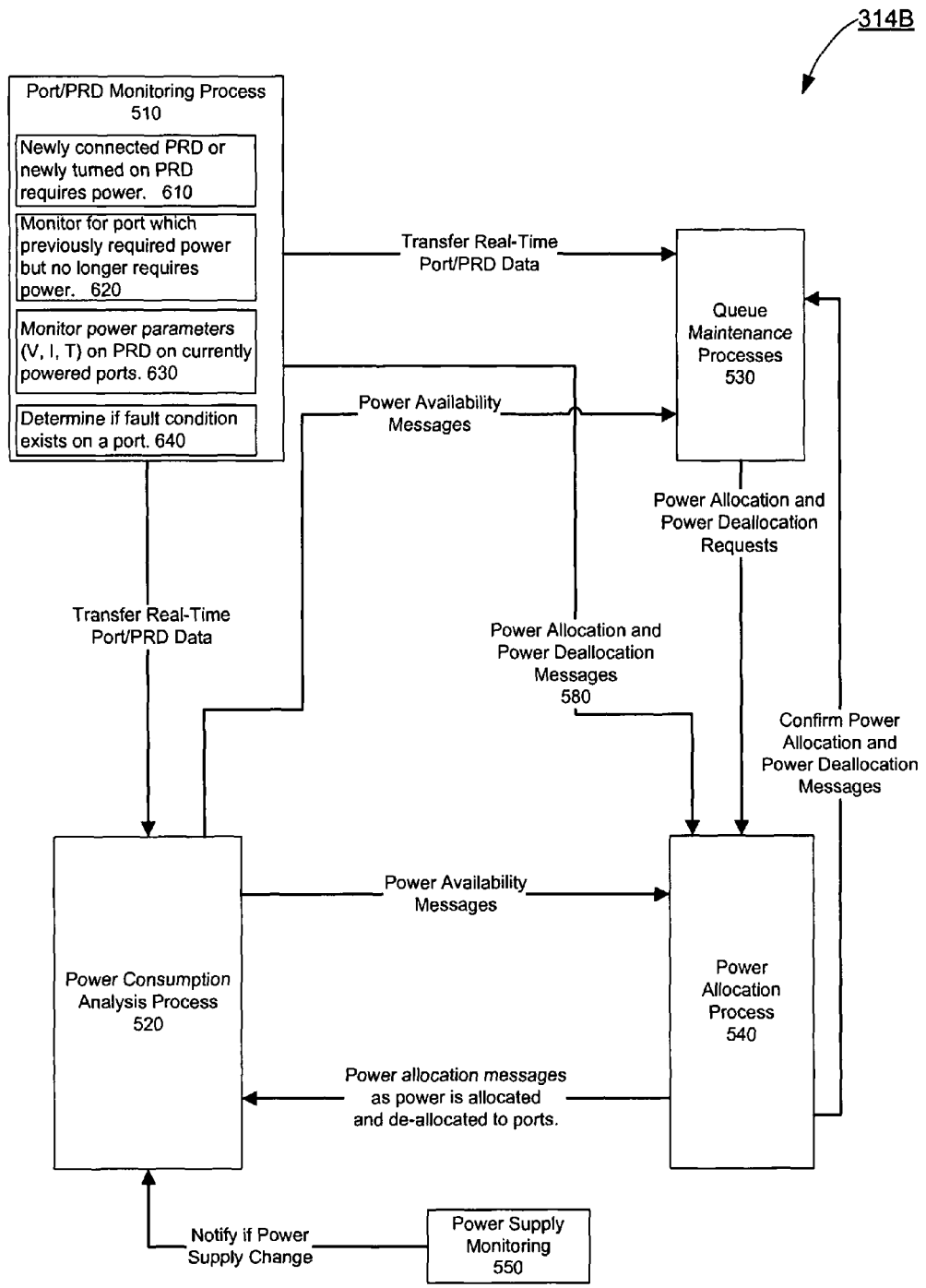

FIG. 6 is another view of the method presented in FIG. 5. The figure shows in detail the steps involved in a port/PRD monitoring process.

Figure 7:
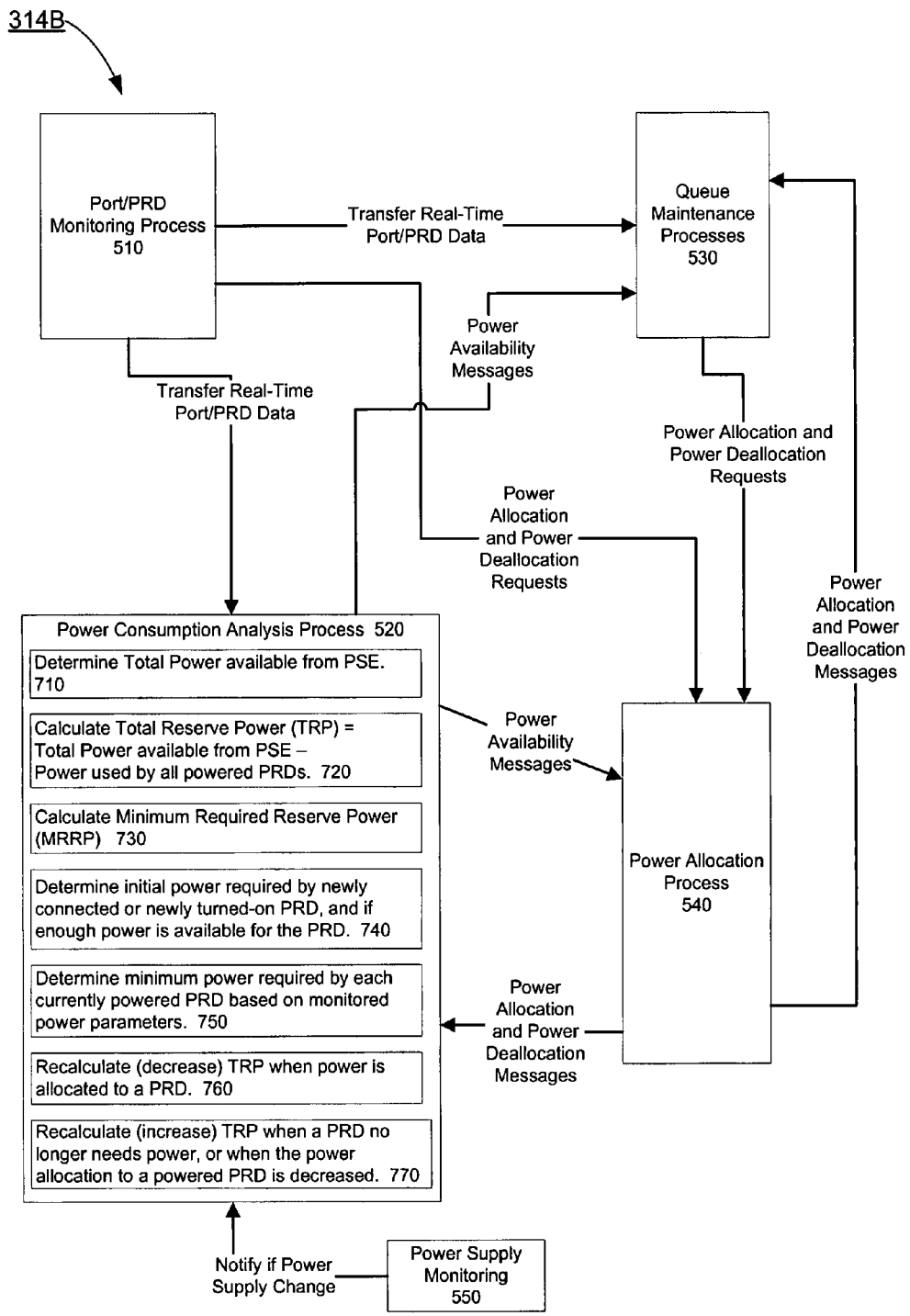

FIG. 7 is another view of the method presented in FIG. 5. The figure shows in detail the steps involved in a power consumption analysis process.

Figure 8:
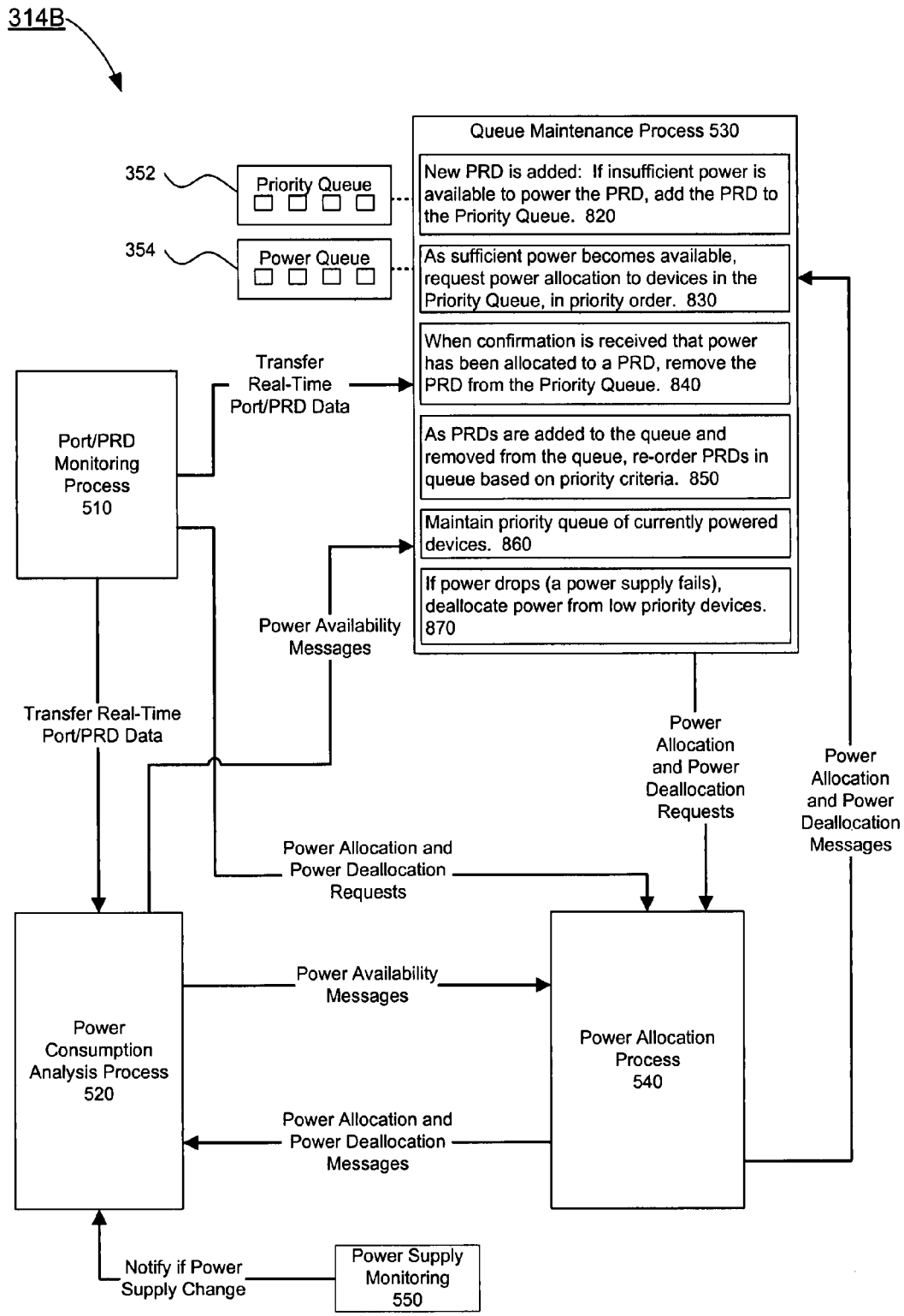

FIG. 8 is another view of the method presented in FIG. 5. The figure shows in detail the steps involved in a queue maintenance process, wherein the queues are those illustrated in FIG. 3B.

Figure 9:
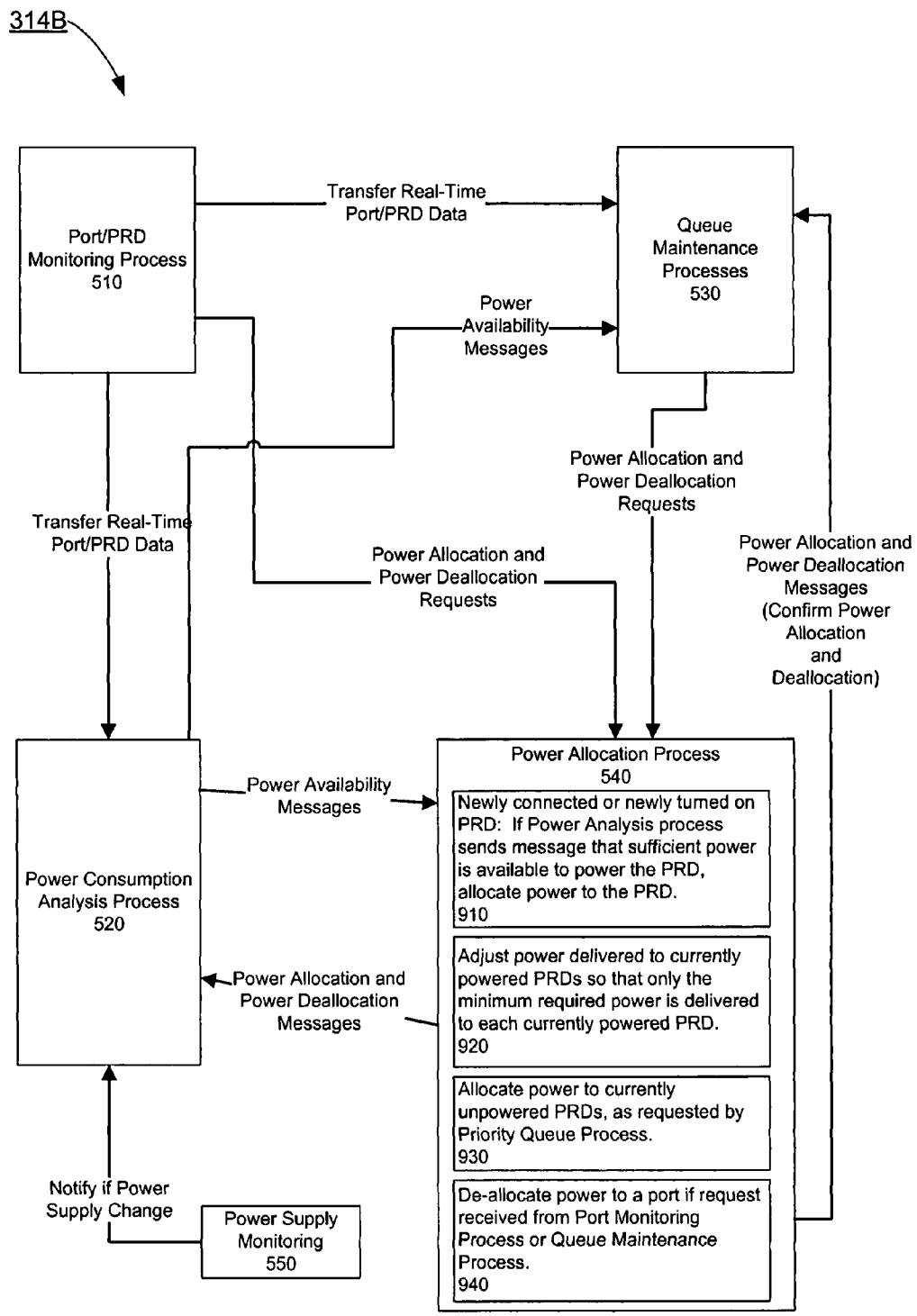

FIG. 9 is another view of the method presented in FIG. 5. The figure shows in detail the steps involved in a power allocation process.

DETAILED DESCRIPTION OF THE INVENTION

I. Introduction

The present invention is directed to a system and method for dynamic power management and allocation in a communications system or communications network. In an exemplary embodiment, power is provided from power source equipment (PSE) to one or more power requiring devices (PRDs) via a means of power conveyance, such as network cabling. In one embodiment of the present invention, the PSE is contained in the same hardware unit or device which also serves as the data communications equipment (DCE), that is, the hardware unit or device which transmits data to and/or accepts data from the PRDs. Further, data sent back and forth via the means of power conveyance may include, in addition to any network communications proper, data which is related to power management of the PRD or PRDS.

It should be understood that this communications system configuration is exemplary only, and other communications system or network configurations are possible and are consistent with the functioning of the present invention. For example, in an alternative embodiment of the present invention, the DCE and the PSE could be in physically separate units or cases, and could send data and power respectively to the PRDs via separate cables or other means. The dynamic power management methods of the present invention might then entail some further connection between the DCE and the PSE, such that power management related data and power management control information could be passed back and forth between the DCE and the PSE.

Persons skilled in the relevant art(s) will appreciate that while the methods described in the following discussion will be applied in the context of devices which use electrical power and electrical signaling, nothing in the present invention limits the invention to the management of power supplied as electrical power via conventional cables which typically use insulated or shielded metal wires, or other metallic pathways or metallic means of power conductance.

Rather, the method of the present invention may be applied to other technologies for both power conveyance and signal communication. For example, optical communications are increasingly used as a means to convey data, and in the near future it may be possible to power a communications system using optical or other purely electromagnetic-wave-based power conveyance means including, for example and without limitation, laser light, infrared light, microwaves, or x-rays. The method of the present invention can be employed in these contexts as well to provide dynamic power management, wherein the power allocated to each individual network PRD is substantially minimized, and wherein as a result the total number of network PRDs that can be supported with the available power may be substantially maximized.

However, for purposes of illustration and exposition only, the following discussion will describe the methods and operations of the present invention in the context of a particular type of communications system technology, namely, a communications network employing Ethernet protocols and Ethernet hardware, and in particular employing the recently developed 802.3af Power-over-Ethernet (PoE) technology. In this context, an Ethernet switch will be understood to combine both the network DCE and the network PSE. The terms "Ethernet switch", "DCE", "PSE", and "PoE switch" will be used interchangeably throughout the remainder of this document, the only exception being when an Ethernet switch is specifically indicated as being a legacy Ethernet switch, which by definition does not support PoE capability.

It will be further understood that a switching system which is functionally equivalent to a PoE Ethernet switch may also be embodied in the form of a combination of a legacy Ethernet switch, that is, an Ethernet switch which does not support the 802.3af standard, working in combination with a mid-span PSE which adds power to the Ethernet signal carried over the Ethernet cabling, wherein the mid-span PSE would typically be used to embody the system and method of the present invention.

Further, in this document the terms "power requiring device" or "PRD", and the plural forms thereof, are used to refer to those network devices which are connected to the PSE. PRDs are typically communications devices which may accept and/or receive data. Such devices may include, for example and without limitation, wireless access points, VoIP telephones, web cameras, a variety of security control devices, modems, routers, security devices, desktop computers, laptop computers, and any number of other technologies which receive and transmit communications, typically but not necessarily employing Ethernet protocols and Ethernet cabling.

It should be noted that the conventional term in the art for such devices is "powered device", "PD", or the plural forms thereof. This document employs the alternative forms "power requiring device" and "PRD", or the plurals thereof, to avoid any apparent ambiguity or apparent contradiction when speaking of devices which are "powered" and devices which are "unpowered". That is to say, the phrase "powered powered device" may seem redundant, while the phrase "unpowered powered device" may seem contradictory, and in general both such phrasings may seem unclear as to the power state of a device; whereas, the phrases "powered power requiring device" and "unpowered power requiring device" clearly signify a device which requires power, and which further is either currently powered or currently unpowered, respectively.

It should be understood that in all respects the terms "power requiring device", "PRD", or the plurals thereof, are entirely synonymous with the terms "powered device", "PD", and the plurals thereof, as conventionally employed in the art; and further, that those devices signified herein as a "power requiring device", "PRD", or the plurals thereof, are entirely the same as those devices which are, within the art, conventionally referred to as a "powered device", "PD", or the plurals thereof. The use of an alternative phrasing or alternative acronym is intended exclusively for clarity of exposition, and signifies no technological, structural, functional, or operational distinction of any kind.

Several terms are used throughout this document to refer to the power which a PSE may convey to a PRD, including such terms as "allocate" or "allocated", "deliver" or "delivered", and "supply" or "supplied". In general, and unless noted otherwise, the following conventions hold:

The terms "deliver" and "supply" and variations thereof ("delivered", "delivering", "supplied", "supplying", etc.) refer to an actual amount of power being conveyed from a PSE to a PRD. This amount of power may vary significantly over time, including over very brief intervals of time, depending on the load being placed on the PSE by the PRD.

The term "allocate" and variations thereof ("allocated", "allocating", etc.) typically refers to an amount of power which the PSE has set in reserve to deliver to the PRD. For example, and as discussed in more detail below, the PSE may typically make an initial power allocation to a PRD based on the PRD power classification, provided that power classification is available. If the power classification is not available, the PSE may initially allocate a maximum power to the PRD based on a maximum power which the PRD's port may accept, or based on other criteria.

When power is initially allocated to a PRD by the PSE, meaning the PSE has reserved a certain amount of power for the PRD, typically the PSE will also begin the actual delivery of power to the PRD. This combined allocation and delivery of power to a PRD will in some cases be implied when this document describes the allocation of power to a newly attached or newly powered-on PRD. Similarly, when the PSE deallocates power from a PRD, this entails no longer holding the power in reserve for the PRD, but it will be understood that this also typically entails the actual cessation of power delivery from the PSE to the PRD.

Using the method of the present invention, the power allocated to a PRD may vary over time as a determination is made that the PRD is actually drawing substantially less power or substantially more power than was previously allocated. It may be the case, however, that the power allocated to a PRD may vary more slowly than the variation in the power actually supplied to the PRD, for example, because the power allocation may be based on some time average of the power supplied to the PRD, or for some other reason.

It should be noted that communications systems which deliver power over a communications link, such as PoE systems, may also have connected to them legacy PRDs which do not accept power over the communications link, but instead require that power be provided via a separate power connection. Typically, the PSE technology will recognize such legacy devices, and will not attempt to supply power to the legacy PRDs over the communications link. For example, the 802.3af standard has specific provisions for recognizing legacy PRDs and not supplying power to them over the communications link.

Consistent with this technological convention, in one embodiment the present invention may not attempt to monitor or regulate power consumption for legacy PRDs or for any communications ports to which such legacy PRDs may be connected. The present invention may only monitor and regulate power associated with those PRDs which are designed to accept power via the communications links of a communications system, typically via a communications port of the communications system. In an alternative embodiment, the present invention may employ additional methods or means to monitor and/or regulate the power consumption of those network devices which do not receive power over the communications system itself, wherein those additional methods or means may be in part or in whole analogous to the methods and means disclosed in detail below.

Finally, persons skilled in the relevant art(s) may recognize some of the steps described as part of the method of the present invention as already being conventional in the art. For example, the 802.3af PoE protocol has provisions for a PoE switch to recognize when a connected PRD becomes disconnected, and consequently to stop supplying power to the port to which the PRD was connected. These steps are none-the-less included as part of the method of the present invention, at least in part because the results of these steps influence other aspects of the method of dynamic power management. For example, and as discussed further below, once power is no longer allocated to a port, that power becomes available for other currently connected PRDs which are currently unpowered. As also discussed further below, the method of the present invention can then search a queue or other list of devices awaiting power to determine if any of those devices are suitable candidates for being allocated the power which has become available.

II. Exemplary System

Figure 1A:
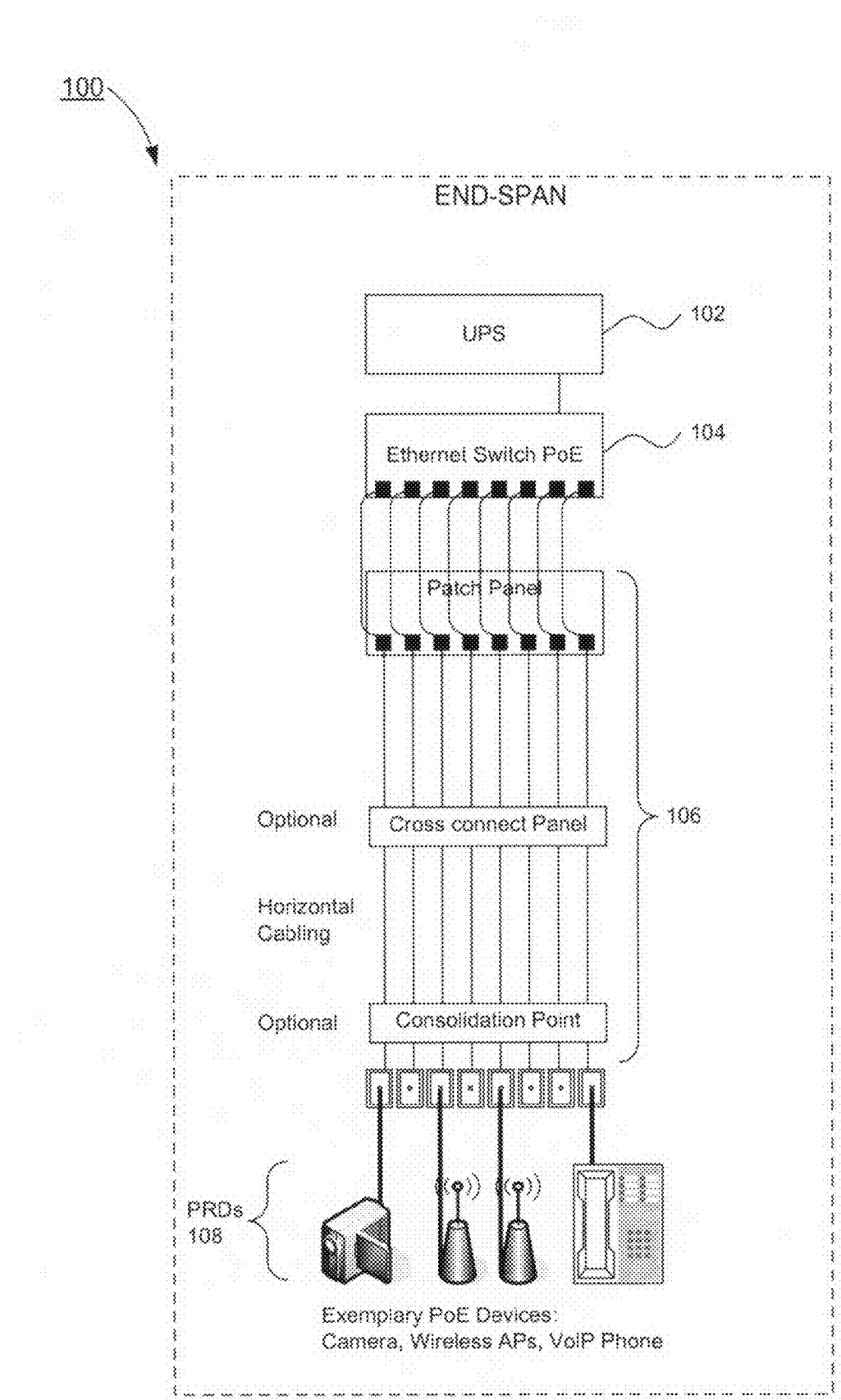
FIG. 1A depicts an exemplary communications system deployment, and specifically a Power-Over-Ethernet (PoE) system deployment, in which the present invention might be employed, wherein the PoE system is deployed in an end-span configuration.
Figure 1B:
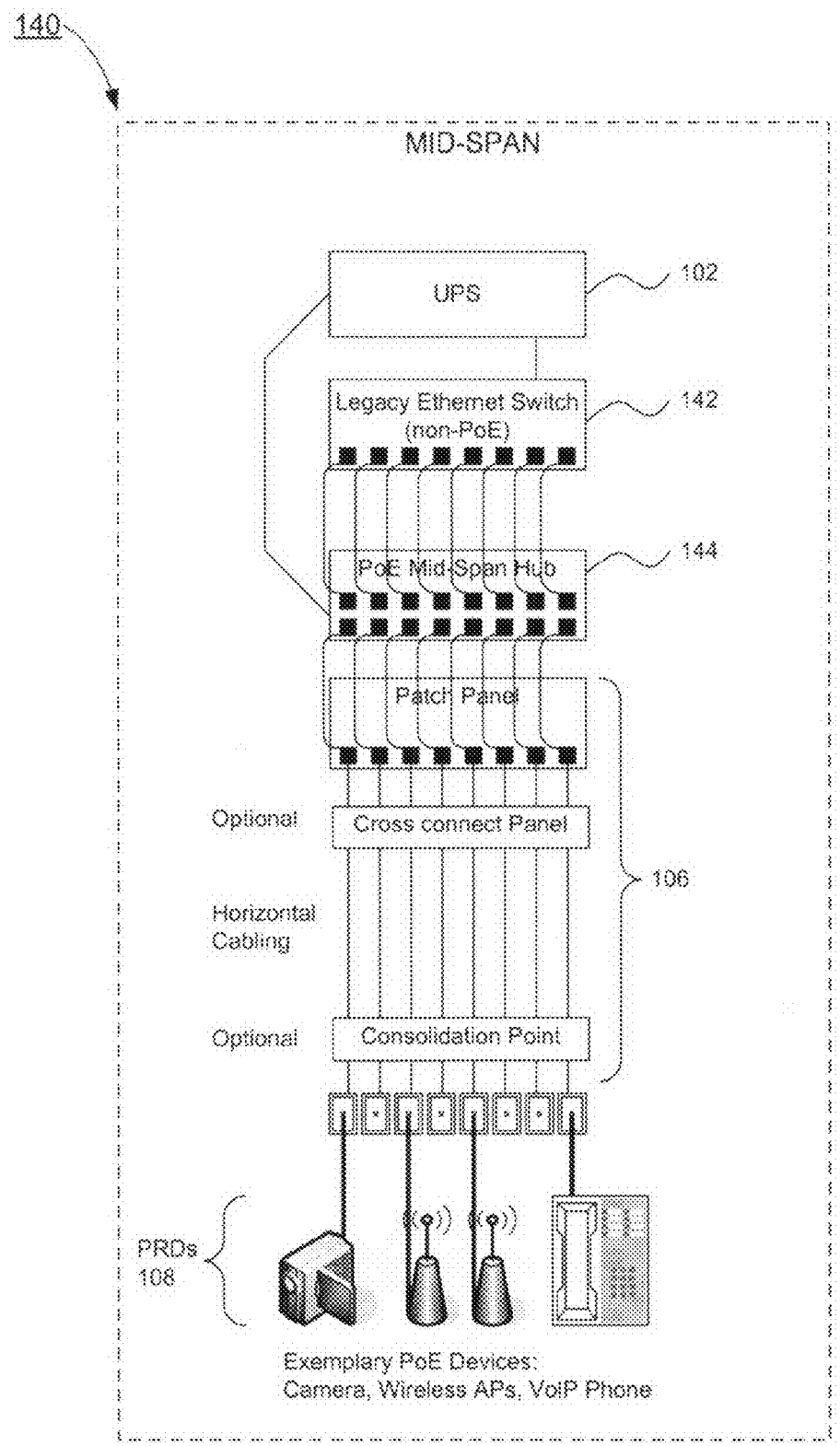
FIG. 1B depicts an exemplary communications system deployment, and specifically a Power-Over-Ethernet (PoE) system deployment, in which the present invention might be employed, wherein the PoE system is deployed in a mid-span configuration.

FIGS. 1A and 1B offer illustrations of Power-Over-Ethernet (PoE) system deployments 100 and 140 in which the present invention might be employed. Exemplary deployment 100 in FIG. 1A shows an end span configuration. In this configuration, an uninterruptible power supply (UPS) 102 is connected to a communications system 104. The IEEE standard 802.3af is embodied within the technology of the communications system itself, which in this case is a PoE Ethernet switch. That is to say, the Ethernet switch 104 actually contains the power source equipment (PSE), and in fact is considered to be the power source equipment. The Ethernet switch 104 also contains the necessary hardware and software to implement the functionality of the 802.3af standard. In addition, the dynamic power management method and system of the present invention is embodied within the Ethernet switch 104 as well.

The PoE switch ultimately provides both data and power to PRDs 108, such as the PoE VoIP phone, APs, and video camera illustrated. In the deployment illustrated in FIG. 1A, there are additional, optional intermediate connections and hardware 106 between the PoE switch 104 and the communications devices 108. These include a patch panel, cross-connect panel and consolidation point. The presence of the intermediate connections and hardware 106 does not materially alter the method or operations of the present invention within PSE 104.

A second exemplary deployment 140, wherein the present invention might be employed, is shown in shown in FIG. 1B. In deployment 140, a conventional communications system 142, such as a conventional Ethernet switch 142, is again connected to UPS 102, but now only for purposes of powering the internal functions of communications system 142. Power for the PRDs 108 is provided via a mid-span PoE device 144, which is inserted somewhere along the path between the Ethernet switch 142 and the PRDs 108. As before, intermediate switching devices 106 may be present, but are not essential to the operation of the current invention.

The mid-span PoE device 144 is merely a carrier for the Ethernet signals sent to and from Ethernet switch 142. However, mid-span PoE device 144 is also the PSE for the PRDs 108, loading the power onto the Ethernet cabling which is routed to the PRDs 108. The mid-span PoE device 144 embodies the 802.3af technology, and also embodies the dynamic power management technology of the present invention.

In both deployment 100 which employs end-span PoE and deployment 140 which employs mid-span PoE, the end devices 108, that is, the PRDs 108, receive their power directly over the Ethernet connection. It should be understood that the present invention could be employed using any communication system having power source equipment. The Ethernet PoE switch 104 and the mid-span PoE device 144 are merely representative devices and do not limit the current invention. For convenience only, the following discussion assumes that the present dynamic power management invention is being implemented directly on an Ethernet switch 104, but it should be understood that other embodiments are possible as well.

FIG. 2 is a block diagram 200 showing both part of the internal structure of representative communications system 104, such as a PoE switch 104, as well as part of the internal structure of representative PRD 108, which may be used in one embodiment of the present invention. PoE switch 104 contains one or more ports 216, such as PoE ports which provide both data and power to PRDs 108. Only two such ports are illustrated in FIG. 2, but typical real-world devices will commonly contain many more ports, and additional ports may be assumed for the PSE 104 under consideration in conjunction with the present invention. Two PRDs 108 are shown, one of which is a currently powered PRD 224, and the other of which is a currently unpowered PRD 226. Other powered PRDs 224 and/or unpowered PRDs 226 may be attached, but are not illustrated.

Note that in the ordinary and routine course of operations of PSE 104 and one or more PRDs 108 which may be attached to PSE 104, a PRD 108 which is an unpowered PRD 226 may become a powered PRD 224, and similarly a PRD 108 which is a powered PRD 224 may become an unpowered PRD 226. The function of a PRD 108 as either a powered PRD 224 or an unpowered PRD 226 depends on a number of operational factors including, for example and without limitation, whether or not PRD 108 is currently powered on, whether or not PRD 108 is currently experiencing a fault condition, and whether or not PSE 104 is currently supplying power to PRD 108.

The presence of multiple PRDs 108 attached to PSE 104 is shown for purposes of illustration only. Some or all of the features and methods of the present invention may be operational, in part or in whole, when only one PRD 108 is attached to PSE 104 or when no PRDs 108 are attached to PSE 104. In addition, the presence of a powered PRD or PRD(s) 224 and an unpowered PRD or PRD(s) 226 is for purposes of illustration only. When one or more PRDs 108 are attached to PSE 104, some or all of the features and methods of the present invention may be operational, in part or in whole, when all PRD(s) 108 currently attached to PSE 104 are powered PRD (s) 224 or when all PRD(s) 108 currently attached to PSE 104 are currently unpowered PRD(s) 226.

PoE switch 104 contains an internal power supply 202 which in turn may be fed from external UPS 102. PoE switch 104 also contains power sourcing equipment power manager (PSEPM) 204 which is compliant to the PoE IEEE 802.3af standard. PSEPM 204 is typically embodied in an application specific integrated circuit (ASIC) which controls the power management within the PSE 104 according to the IEEE 802.3af standard. The IEEE 802.3af standard is well known in the art and is incorporated here by reference in its entirety.

PSE 104 also contains a controller 206. Controller 206 may be a general purpose microprocessor or it may be another ASIC, or it may actually be a combination of one or more of the above, that is, a microprocessor working in conjunction with an ASIC. Controller 206 serves multiple purposes within PSE 104. It regulates communications with one or more external data or control sources, i.e., data terminal equipment (DTEs) (not shown), and also regulates the data which is transmitted over internal Tx/Rx lines 208 used for Ethernet transmission and reception via Ethernet ports 216, and thence via Ethernet ports 216 over Ethernet cables 230 to PRDs 108.

Controller 206 may also be connected to internal memory 212 via bus 214, where internal memory 212 may include, for example and without limitation, conventional random access memory (RAM), an internal hard drive, or other suitable memory for storing instructions which may be necessary for processing, especially in the event that the current invention is embodied in the form of a microprocessor which processes instructions. Memory 212 may store the instructions. Memory 212 may also store the data used by the present invention which may include, for example and without limitation, the amount of power currently allocated to PRDs, a history of power consumption by PRDs, the priority of PRDs as represented in a queue structure or other data structures in memory, and other pertinent data. Memory 212 may further be comprised of permanent or semi-permanent memory including, for example and without limitation, ROM, E-PROM, or EE-PROM.

In addition to controlling the communications of transmitted and received signals over Tx and Rx lines 208, controller 206 is also connected to PSEPM 204 via a bus 210, where bus 210 may be the same bus as bus 214 or may be a separate bus. The specific configuration of the bus is not essential to the current invention. Controller 206 accepts data about current power management activities from PSEPM 204 over bus 210. Controller 206 additionally may also modulate or regulate the activities of PSEPM 204 via bus 210 in order to implement the method or methods of the current invention.

In particular, controller 206 can monitor details of the electrical and other activity of ports 216, such as monitoring the consumed voltage, the consumed current, and the port temperature. This monitoring may be done directly via the connection for the Tx and Rx lines 208, or it may be done via bus 210 obtaining this information from PSEPM 204. The ability of controller 206 to monitor port current, voltage, temperature, and possibly other parameters of ports 216 enables controller 206 to determine the power consumption of ports 216, possible fault conditions of ports 216, and possibly other operating conditions of ports 216.

PRDs 108 are connected to PSE 104 via Ethernet cables 230, where Ethernet cables 230 in turn are connected to ports 216 of PSE 104. PRD 108 typically has on board a management information base (MIB) 222. MIB 222 contains internal configuration data regarding PRD 108. For example, according to the IEEE standard 802.3af, PRDs which are compliant with the standard may have an onboard rating of their power requirements. That is to say, they will have a power classification rating which may be 1, 2, or 3, '1' being the lowest power requirement and '3' being the highest power requirement. MIB 222 of PRD 108 can report to PSE 104 the power classification of PRD 108.

In addition, PRDs 108 may also report other information to the PSE 104 via Ethernet cable 230 and via port 216, where this additional information may be utilized by controller 206 as part of the dynamic power management process of the present invention.

In one embodiment of the present invention, all power regulation concerning the power supplied by PSE 104 to PRDs 108, via ports 216 and Ethernet cable 230, is controlled by PSEPM 204, where in turn the power regulation activities of PSEPM 204 may be determined by controller 206 via bus 210 according to the methods described further below.

In an alternative embodiment of the present invention, some of the power regulation activities may be determined directly by controller 206 via transmission lines 208, and then via ports 216 and Ethernet cable 230. All other power management activities may be done as described above via PSEPM 204. In yet another embodiment of the present invention, all the power regulation activities may be determined directly by controller 206 using the methods described below.

PoE switch 104 may be connected to an external data source, control system, and/or monitoring system such as a digital computer or other DTE, not shown. The external data or control source is connected to communications port 218, which in turn is controlled by communications manager 219 via a bus which may be the same as bus 214 or 210, or another bus. Communications manager 219 is typically an ASIC which is designed to accept external communications. Communications manager 219 in turn is connected to controller 206 via a bus which may be the same as bus 210 or bus 214, or another bus. The details of the bus implementation do not matter for the current invention.

Communications port 218 may be, for example and without limitation, a serial port, a parallel port, a USB port, an IEEE 1392 or "Firewire" port, a wireless port conforming to IEEE 802.11, Bluetooth, or other wireless protocols, an infrared port, or possibly a dedicated Ethernet port used specifically for control of PSE 104. The external controller, monitoring system, or other DTE may be used for several purposes. It may be used to upload power-related parameters, such as a preassigned priority value of a communications port 216 of the PSE 104, or a user-designated PRD importance which assigns to different PRDs 108 a priority in terms of being either assigned to a priority queue or power queue, both of which are discussed further below. The external controller, monitoring system, or other DTE may feature a graphical user interface, not shown, for communicating information to a network engineer or other user, and for accepting or modifying operating parameters for the present invention from the network engineer or other user. The external controller, monitoring system, or other DTE may also feature one or more databases for accepting, storing, and analyzing short-term or long-term trends in power usage as reported by the current invention.

These power-related parameters, once uploaded via communications port 218, can be stored in memory 212 and used by controller 206 as part of the overall power management process of the present invention. Similarly, communications port 218 may also be used to download various power-related information sent by controller 206, which may in turn be used for purposes of external monitoring, external reporting, or maintaining an external database of power activity. Communications manager 219 is a standard ASIC well known in the art for managing communications between communications port 218 and controller 206 and possibly memory 212.

The details of the hardware embodiment of PSE 104 are not essential to the present invention, it being understood that power controlling devices such as PSEPM 204 and/or controlling logic implemented by controller 206 will implement the dynamic power management requirements and methods of the present invention. These methods are now described further in the discussion that follows. In the discussion which follows, only limited reference may be made to the specific hardware technology used to implement these methods in a PSE 104, it being understood that the methods which follow will be implemented via the hardware already described, or analogous hardware embodiments in other communications systems.

FIG. 3A illustrates a method 300 according to one embodiment of the present invention, whereby a PSE 104 and associated PRDs 108 are initially powered on, and wherein the current method of dynamic power management is initiated.

In initial step 302 the PSE 104 is powered on. In step 304, the initial power requirements of the initially attached PRDs 108 are then determined. Communication is established between PSE 104 and the PRDs 108 according to the 802.3af standard via methods which are well known in the art.

During the initial handshaking between PSE 104 and PRD 108, PSE 104 determines the initial power allocation to be made to each PRD 108 based on any of several criteria. These criteria may include, for example and without limitation, a power classification which is built into the MIB 222 of the PRD 108, or a maximum power which can be allocated to the communications ports 216 of the PSE 108, or a predefined power allocation which has been defined by a user of the system and which is stored in memory 212 of PSE 104.

Once the initial power requirement is determined, power is allocated to the initially attached PRDs in step 306. For example, power may be allocated sequentially to each of the attached PRDs 108 in the order of the ports to which they are attached, wherein ports 216 may typically be numbered from one to the maximum number of ports on the PSE 104, or power may be allocated based on a user-designated port priority. PSE 104 may continue to allocate power as long as sufficient power is available to power the next device in order of the initial allocation sequence.

Once power has been allocated to all attached devices, or once the maximum available power has been allocated, the method of dynamic power management 316 begins. The method 316 has two phases, a dynamic power initialization phase 312, following by a second phase of ongoing dynamic power management 314.

Dynamic power initialization phase 312 may entail three steps, a data structure initialization step 307, a power allocation assessment step 308, and a queue loading step 310.

In data structure initialization step 307, data structures necessary to the method are initialized. These data structures may include a priority queue and possibly a power queue, or other data structures, which may indicate the priority of PRDs 108 for power allocation and/or power deallocation. The data structures may also include databases which can track a variety of data which is helpful to the method of the present invention. Such tracked data may include, for example and without limitation, the power currently allocated to PRDs, a history of PRD power consumption, port priorities as designated by a system administrator or other user, and other information relevant to the methods of the present invention.

Note that initialization step 307 may entail the loading of data from a source of long-term storage, such as an external DTE which maintains a database of prior power consumption of PRDs. Note also that some of the data structures used by the method of dynamic power management 316 may include data structures used in earlier steps. For example, a data structure which maintains a listing of port priorities, and which may have been used in step 306 to help determine initial power allocation, may also be employed by the method of dynamic power management 316. In this case, the relevant data structure or data structures may already have been initialized in step 306 and may not need to be initialized again in step 307.

In one embodiment of the present invention, an assessment is made in power allocation assessment step 308 as to whether all initially attached devices have been allocated power. If the answer is yes, then ongoing dynamic power management method 314 is initiated. In step 308, it may be determined that not all of the initially attached devices were allocated power, meaning there was insufficient power to allocate power to all the attached PRDs 108. In this case initialization step 310 is performed, wherein unpowered PRDs 226 are added to the priority queue, or are added to other data structures wherein the priority of the unpowered PRDs is designated by other means discussed further below. Following this, the method of ongoing dynamic power management 314 is initiated as discussed further below.

In an alternative embodiment of the present invention, devices which are allocated power during initial power allocation may be added to a power queue, as discussed further below.

FIG. 3B is a representative depiction of several PRD queues 350. In one embodiment of the present invention, the queues are used to store or to indicate the priority of PRDs for power allocation. In an alternative embodiment of the present invention, the priority of PRDs may be stored or indicated by means other than a queue or queues, including, for example and without limitation, a database of PRDs wherein the database has a field or other data structure for indicating the priority of PRDs. While the discussion which follows indicates that queues are used to store or indicate the priority of PRDs, it should be understood that this is for purposes of illustration only. In one or more embodiments of the present invention, it is the storage or indication of PRD priority itself which is used to ensure that available power is allocated to PRDs in a desired manner or desired order.

The one or more queues which may be used to track PRD 108 power allocation priorities may be stored in memory 212 of the PSE 104, and their contents are modified by controller 206 as needed based on the method described below. The memory 212 used for a PRD queue or queues may be, for example and without limitation, dedicated hardware storage, such as dedicated RAM, or a segment of memory 212 which is allocated from RAM wherein other segments of the RAM are allocated for other purposes.

In one embodiment of the present invention, one queue is used to store or indicate the priority of presently unpowered PRDs, and a second queue is used to store or indicate the priority of presently powered PRDs. In an alternative embodiment of the invention a single queue occupying a single region of memory 212 may be used to store multiple types of PRDs, such as powered PRDs and unpowered PRDs, wherein flags or other data elements or data structures embedded within the queue are used to distinguish different types of PRDs, wherein the single queue effectively functions as multiple queues. The details of the storage and structure of these PRD queues 352, 354 and the type of memory 212 used is not essential to the present invention.

The PRD queue or PRD queues store the identity of devices using some kind of unique device identifier which may be, for example and without limitation, an IP address of a PRD, the port number of a port to which the PRD is attached, a unique number generated from one or several selected parameters retrieved from a PRD MIB, or any other value which can serve as a unique identifier for a device.

Priority queue 352 is used to track those PRDs 108 which are connected to PSE 104 but which are not currently powered. Typically, devices are added to priority queue 352 when they are connected to the system and it is determined that there is insufficient power available in order to allocate power to them. As will be discussed further below, PRDs 108 may be stored in the priority queue in an order determined by a number of priority factors.

In one embodiment of the present invention, another queue is power queue 354. Power queue 354 stores the identity of all PRDs which are currently powered. The purpose of the power queue is to maintain a list of these devices in order of a device priority, wherein the device priority may be assigned by the user. It may occur that there is a decrease in the total available power from the PSE, such that it is not possible to power all the currently powered devices. In that event, the order of devices in the power queue determines which devices will become unpowered devices, and hence will be added to the priority queue, and which devices will remain powered and hence remain in the power queue. The details of the utilization of the priority queue 352 and the power queue 354 are discussed further below.

As noted above, the method of dynamic power management of the present invention may entail two phases, namely, an initialization phase 312 and a method of ongoing dynamic power management 314. The method of ongoing dynamic power management 314 entails monitoring the ports and monitoring the power consumption at the ports, and dynamically adjusting power allocation to PRDs 108. The remainder of this document describes the process of ongoing dynamic power management 314.

III. A First Method According to the Present Invention

FIGS. 4A and 4B together present a flowchart illustrating one embodiment 314A of the method of ongoing dynamic power management 314. The flowchart has been broken into two figures for ease of reading only, and embodies one unified method. Note that step 420 of FIG. 4A connects to step 430 of FIG. 4B, and step 450 of FIG. 4B connects back to step 404 of FIG. 4A.

Of the steps illustrated, the steps with shadowed highlighting, namely steps 402, 404, 410, 420, and 430, represent steps which initiate monitoring of a port 216 and determine the status of a port 216, such as determining if a port 216 has a PRD 108 connected to it or if the port 216 requires power. The steps that do not have shadowed highlighting represent responses made based on the status determinations of steps 404, 410, 420, and 430. The steps described below are performed on a repeated or ongoing basis. In particular, and as described in detail below, the ports 216 may be monitored repeatedly in sequence.

Step 402 begins with monitoring a port 216 in the communications system. The initially monitored port 216 may be a port which is considered to have highest priority, such as a lowest numbered port.

In step 404 a determination is made if the port 216 currently being monitored previously required power but no longer requires power. If the answer is yes, then in step 406 the method of the present invention stops supplying power to the port 216. In addition, the method of the present invention in step 408 recalculates a total reserve power (TRP) which is available.

In one embodiment of the present invention, the TRP is calculated by determining the maximum power supplied by the PSE 104, where this is typically the maximum power available from internal power supply 202, minus a sum of the power presently being supplied to all ports 216 with powered PRDs 224. In an alternative embodiment of the present invention, the TRP is calculated by determining the maximum power supplied by the PSE 104, minus a sum of the maximum power supplied to all ports 216 with presently powered PRDs 224 attached to them, where the maximum power may be the maximum supplied since PSE 104 was powered on and each powered PRD 224 was powered on, or where the maximum power may be the maximum power supplied during some recent time interval. The time period for the recent interval may vary in different embodiments of the invention, and may range anywhere from microseconds up to several minutes or longer.

In another alternative embodiment, the TRP is calculated by first finding the average power consumed over a period of time by each port 216 with a presently powered PRD 224 attached to it, then taking the sum of the average power consumed by each such port 216 over the period of time, and then subtracting that sum from the maximum power supplied by PSE 104. The time period for the average may vary in different embodiments of the invention, and may range anywhere from microseconds up to several minutes or longer.

In yet another alternative embodiment, the TRP is calculated by first dividing a recent period of time into a number of time slices, then calculating the average power consumed during each time slice by all ports 216 with powered PRDs 224 attached, then selecting the average PRD power consumption from one such time slice, and then subtracting that selected average PRD power consumption from the maximum power supplied by PSE 104. The selected average PRD power consumption may be the largest average from among all the time slices, or it may be some other average. The time period for each time slice may vary in different embodiments of the invention, and may range anywhere from microseconds up to several minutes or longer.

In general, the TRP may be calculated as the maximum power supplied by PSE 104 minus a value which is indicative of the power consumption by powered PRDs 224. In yet another embodiment of the present invention, the calculation of the power consumed by all powered PRDs 224 may sometimes be made as a sum of the maximum power used by all powered PRDs 224 or as a sum of the power presently being supplied to all powered PRDs 224, while at other times the present method may instead calculate the power consumed by all powered PRDs 224 as an average of the power consumed by all powered PRDs 224 over a period of time, where the average may be one of the averages already described above.

The choice as to whether to calculate the total power used by powered PRDs 224 based on the maximum power consumed or the power being presently consumed; or whether, on the other hand, to calculate the power being consumed based on an average power consumed by the powered PRDs 224, may be based in part on the number of powered PRDs 224 connected to the PSE 104. When only a few PRDs 108 are connected to PSE 104, it is possible that at a given time all the powered PRDs 224 may be drawing their maximum power or near their maximum power. In this case, it may be beneficial to calculate the powered PRD 224 power consumption as the sum of the maximum power which has been observed over time to be drawn by all the powered PRDs 224, or to calculate the power consumption based on the power presently being delivered to the powered PRDs 224.

However, as more and more powered PRDs 224 are connected to PSE 104, it becomes statistically less likely that all the powered PRDs 224 will be drawing a maximum power at the same time. This is because in typical usage, powered PRDs 224 tend to have peaks and valleys in their levels of power consumption, with the peaks occurring only intermittently. Therefore, as the number of powered PRDs 224 connected to PSE 104 increases, it becomes increasingly reliable to calculate the power used by all powered PRDs 224 as a sum of an average power calculated for each powered PRD 224 over time.

In step 404, the method of the present invention determined whether the port currently being monitored previously required power but no longer requires power. If the answer is no, in step 410 a determination is made if the port 216 previously did not require power, but a newly connected PRD 108 or a newly turned on PRD 108 now requires power.

If the answer is yes, in step 412 it is determined whether there is enough power available from PSE 104 to supply initial power to PRD 108. A method for determining if there is enough power available to power a PRD 108 is described further below. If the answer is yes, then an initial power allocation 414 is made to the PRD 108 and in addition, optionally, the device may be added to the power queue 354. Finally, a recalculation 408 is made of the TRP as already described above. On the other hand, if in step 412 it is determined that there is not enough power available from PSE 104 to allocate initial power to PRD 108, then in step 418 PRD 108 is added to the priority queue 352.

If in step 410 it is determined that a new requirement for power does not exist, then a determination 420 is made as to whether the port 216 has a powered PRD 224 connected to it. If the answer is yes, then at step 422 the PSE 104 monitors the power consumption parameters such as the voltage and the current consumed by the port 216, and the port 216 temperature. A recalculation 424 is made of the power required by the port 216. In one embodiment of the present invention, this may entail calculating the minimum power required by the port over a period of time. In another embodiment of the present invention, this may entail calculating a minimum power required by the port, multiplied by some factor greater than one in order to introduce a buffer that takes into account occasional requirements for additional power.

Persons skilled in the relevant art(s) will appreciate that while the value of theoretical interest may be the power consumed by the PRD 108 attached to the port 216, the values of practical interest may be the current, voltage, and related parameters pertaining to electrical activity measured at port 216 itself. Since the PSE 104 must supply power to its own ports 216, a method of ongoing dynamic power management 314 may address the actual power requirements of the ports themselves. However, as discussed further below, in one embodiment of the present invention, information reported by PRD 108, such as the PRD power classification, may be taken into account when calculating an amount of power to be delivered to port 216.

Recalculation 424 can be made according to a number of algorithms. In one embodiment of the present invention, the minimum power required by the port 216 is determined based on the maximum power that has been utilized by the port 216 over some period of time. In another embodiment, the minimum power required by the port 216 is based on an average power required by the port 216 over some period of time. In yet another embodiment of the present invention, the minimum power required by the port 216 maybe based on some combination of the maximum power requirements seen over a period of time plus an average of the power seen over a period of time. In another embodiment of the present invention, the minimum power required by the port 216 may be calculated based on both a maximum power utilized by the port 216 over a period of time and an average power required by the port 216 over a period of time, and also based on a power classification of the PRD 108 connected to the port, wherein the power classification of the PRD 108 is reported by MIB 222 of PRD 108.

In step 426, PSE 104 adjusts the power which is allocated to PRD 108 by PSE 104 so that only the minimum required power is allocated to PRD 108. Finally, a recalculation 408 is made of the TRP as already described above.

If in step 420 it was determined that the port does not have a powered PRD 224 connected to it, the method of the present invention moves on to step 430. In step 430 a determination is made as to whether the port has connected to it an unpowered PRD 226 which is in the priority queue 352. If the answer is yes, then unpowered PRD 226 is in the priority queue 352 awaiting the assignment of power, if power is available. At step 432 a determination is made as to whether there is enough reserve power available to power the unpowered PRD 226. A method to determine whether or not there is enough reserve power available to power an unpowered PRD 226 is described further below.

If there is not enough power available to power unpowered PRD 226, then in step 434 the unpowered PRD 226 is not powered and instead remains in the priority queue 352. If there is enough power available to power unpowered PRD 226, then a determination 436 is made as to whether the unpowered PRD 226 is queued ahead of or at the same priority level with all other unpowered PRDs 226 in the priority queue 352 which could also be powered by the available power. This determination may be made based on the position of the unpowered PRD in the priority queue 226, where for example an unpowered PRD 226 earlier in the queue may have a higher priority than an unpowered PRD 226 later in the queue. If the answer is yes, then power is allocated 438 to the unpowered PRD 226, and a recalculation 408 is made of the TRP as described above.

If it is determined at step 436 that the currently unpowered PRD 226 is prioritized at a lower priority than other unpowered PRDs 226 in the priority queue 352, wherein the other unpowered PRDs 226 which could also be powered by the available power are at a higher priority then the unpowered PRD 226 presently under consideration, then power may not be allocated to the unpowered PRD 226 presently under consideration. However, when there is insufficient power available to allocate power to a higher priority unpowered PRD 226 because of the specific power requirement of the unpowered PRD 226, power may then be allocated to an unpowered PRD 226 which has a lower priority, but also has a lower power requirement.

Following step 408, wherein the TRP has been recalculated after power allocation to a port, or following steps 418 or 434, wherein a decision has been made to not allocate power to a port, or following step 436 if an unpowered PRD 226 is ranked too low in priority to be allocated power, the method of the present invention proceeds to step 450 wherein the next port 216 is monitored. The method continues with step 404 and proceeds as described above.

As discussed above, there are two cases in which a determination must be made as to whether there is sufficient power available to power an unpowered PRD 226. The first is the case where a new unpowered PRD 226 is connected to the PSE 104, or an already connected unpowered PRD 226 which was powered off is now powered on. The second is the case where an unpowered PRD 226 in the priority queue 352 is being considered for possible allocation of power.

In both cases, the method of ongoing dynamic power management 314 must first determine the power required by the unpowered PRD 226. As discussed above, this may be determined based on a number of factors, including any one or more of: (a) the PRD power classification reported by the PRD's MIB 222; (b) the maximum power that can be allocated to the port 216 to which the unpowered PRD 226 is connected; or (c) a user-designated, pre-defined power allocation. In another embodiment of the present invention, the PSE 104 may maintain one or more databases of devices which were previously powered on, or devices which were previously connected to the PSE 104, or both, wherein the database or databases may be short-term or long-term databases, or both. A short-term database may contain power information from the present period of PSE 104 operation, where the present period may be defined as starting from the time when the PSE 104 was most recently powered on. A long-term database of power information may contain power information from earlier periods of PSE 104 operation.

Using the data contained in the one or more databases, the PSE may recognize specific PRDs 108, and determine a power requirement based on historical power requirements of a specific PRD 108, wherein the specific PRD 108 may in turn be recognized by specific internal identifiers provided by the PRD 108 over the communications link 230.

Once the method of ongoing dynamic power management 314 has determined the power required by an unpowered PRD 226, the method must determine if enough power is actually available from the PSE 104 to power the unpowered PRD 226.

This determination may be made according to whether or not there is enough reserve power available from the PSE 104 to power the unpowered PRD 226. In turn, this assessment is based on whether, if power were allocated to unpowered PRD 226, a minimum required reserve power would still remain available.

In one embodiment of the present invention, the minimum required reserve power (MRRP) is determined as:

MRRP=the maximum power that can be used by the highest powered PRD 108 which is connected to PSE 104. Stated another way, in this embodiment the MRRP is determined by examining all the PRD(s) 108 presently connected to PSE 104, further determining which of those PRD(s) 108 can draw the maximum possible power, further determining what that maximum possible power demand may be for that PRD 108, and then setting the MRRP equal to the maximum possible power.

In another embodiment of the invention, the MRRP is determined as:

MRRP=the maximum power required by the highest powered communication port 216 of PSE 104.

In yet another embodiment of the present invention, the MRRP may be a user-defined value. In yet another embodiment, the MRRP may be a default value which is stored in the PSE 104. In yet another embodiment, the MRRP may be based on an historical value for a maximum power consumption by a port 216 or PRD 108.

To determine, in step 412 or in step 432, if there is enough reserve power to power unpowered PRD 226, the method of the present invention calculates a post-allocation reserve power, or PARP, wherein:

PARP=TRP−power required by the unpowered PRD

This PARP indicates how much power would remain available if power were allocated to the PRD 108. Finally, a determination is made:

If PARP>=MRRP, then allocate power to unpowered PRD 226.

If PARP<MRRP, then do not allocate power to unpowered PRD 226.

In other words, if the power allocation to the unpowered PRD 226 would leave a reserve power which is greater than or equal to the minimum required reserve power, proceed with the power allocation. If the power allocation to unpowered PRD 226 would leave a reserve power which is less than the required minimum, then do not proceed with the power allocation to unpowered PRD 226.

It should be understood that this is only one possible embodiment of a step-by-step port monitoring process. The steps performed do not necessarily need to be performed in the order indicated, and in some embodiments of the invention, some of the steps may be omitted and other steps may be added.

In particular, the present invention may employ a method for determining when to deallocate power from ports if there is a reduction in the total power available from PSE 104. This may happen, for example, if there is a disruption in the power available from the primary power source of the facility. This may also happen in the event that the PSE 104 employs two or more internal power supplies 202, and one of the multiple power supplies fails. A method for determining which powered PRDs 224 should then be deallocated power, meaning they should no longer be supplied power and should be removed from the power queue 354 and instead assigned to the priority queue 352, is described in greater detail in conjunction with another embodiment of the method of the present invention, namely, method 314B which is described further below.

IV. A Second Method According to the Present Invention

FIG. 5 presents another embodiment of the method of ongoing dynamic power management 314 of the present invention, namely, method 314B wherein multiple processes occur in parallel. These processes include port/PRD monitoring process 510, power consumption analysis process 520, queue maintenance process 530, power allocation process 540, and power supply monitoring process 550.

In turn, these processes communicate with each other through a series of messages. These messages provide necessary information for each process to perform its calculations or to perform the tasks assigned to the process. For example, port/PRD monitoring process 510 provides to power consumption analysis process 520 real-time port/PRD data 560. In particular, port/PRD monitoring process 510 supplies to power consumption analysis process 520 data 560 which may include, for example and without limitation, whether or not a PRD 108 is connected to a port 216, whether the PRD 108 is consuming power, the temperature of the port 216, the current (I) being consumed by the port 216, and the voltage (V) being used to power the port 216.

Similarly, port/PRD monitoring process 510 may provide to queue maintenance process 530 real time port PRD data 562 which again can include, for example and without limitation, whether or not a PRD 108 is connected to a port 216, whether or not a PRD 108 connected to a port 216 is consuming power, whether or not a PRD 108 connected to a port 216 has been switched on or off, the voltage (V) used by the port 216, the current (I) being consumed by the port 216, and the temperature of the port 216.

Port/PRD monitoring process 510 also sends to power allocation process 540 power allocation and power deallocation requests 580. These are requests to have power allocated to a PRD 108 or to no longer allocate power to a PRD 108. These requests are discussed further below.

Power consumption analysis process 520 sends power availability messages 570 to queue maintenance process 530, and also sends power availability messages 572 to power allocation process 540. These power availability messages indicate the current power which is available to be allocated to devices, which may vary over time, and may also indicate the total reserve power (TRP) and also the minimum required reserve power (MRRP).

The TRP may be calculated similarly to the method described above, that is, as the maximum power supplied by the PSE 104 minus the sum of the power currently being supplied to all powered PRDs 224, or possibly the TRP may be calculated as the maximum power supplied by the PSE 104 minus an average of the power supplied to all powered PRDs 224 over a period of time, or possibly the TRP may be determined based on some other calculation related to the historical power usage by the powered PRDs 108.

Similarly, and as previously described, the MRRP may be based on a number of factors including, for example and without limitation, the power required by the highest powered PRD 224 connected to PSE 104, or the power required by a highest powered communications port 216 of PSE 104, or the highest power indicated by a PRD power classification as reported by the MIB 222 of a PRD 108, or a user-defined value, or an historical value for PRD 108 power consumption, or a default value. The MRRP may be calculated based on a combination of the above factors.

Queue maintenance process 530 maintains and manages priority queue 352 and, in one embodiment of the invention, also maintains and manages power queue 354. Queue maintenance process 530 makes a determination of which devices belong in which queue or queues, and in what order, wherein the order reflects a priority of power allocation or deallocation to PRDs 108. Queue maintenance process 530 makes this determination based on data received from port monitoring process 510 in the form of real time port PRD data 562, and based on data received from power consumption analysis process 520 in the form of power availability messages 570.

Queue maintenance process 530 also sends power allocation and power deallocation requests 582 to power allocation process 540. In addition, queue maintenance process 530 receives from power allocation process 540 messages 592 which confirms when power has been allocated to a PRD 108 and confirms when power has been deallocated from a PRD 108.

Queue maintenance process 530 additionally may receive from port PRD monitoring process 510 information about a PRD 108, where that information may include, for example and without limitation, a PRD 108 power classification, a communications port number of the communications port 216 to which a PRD 108 is connected, a user-assigned priority value of a communications port 216, or a user-assigned priority value of a specific PRD 108. Preassigned, user-designated priority values of communications ports 216 or PRDs 108 may allow the user to override any other priority criteria or priority values, and so determine the order in which a PRD 108 should be placed in priority queue 352 or power queue 354.

Finally, in one embodiment of the present invention queue maintenance process 530 may maintain an internal account of the time order in which PRDs 108 are attached to ports 216 of PSE 104. In another embodiment of the invention, a record of the time order in which PRDs 108 are connected to the ports 216 of PSE 104 may be maintained by port/PRD monitoring process 510, and reported to queue maintenance process 530 via messages 562. This time-ordering of PRD attachments may also be a factor which is taken into account in setting device priorities, and when ordering devices in the queues 352 or 354.

Power allocation process 540 receives from port monitoring process 510 power allocation and power deallocation requests 580 as PRDs 108 are attached to or removed from PSE 104, or as PRDs 108 are powered on or powered off. Power allocation process 540 may also receive from queue maintenance process 530 power allocation requests and power deallocation requests 582 when queue maintenance process 530 determines that devices in the priority queue 352 should be allocated power, or that devices in the power queue 354 should be deallocated power.

Power allocation process 540 responds to messages 582 from queue maintenance process 530 with messages 592 that confirm power allocation and power deallocation. Power allocation process also sends power allocation and power deallocation messages 590 to power consumption analysis process 520, so that power consumption analysis process 520 can update its determination of available power, that is, the TRP. Finally, power allocation process 540 receives power availability messages 572 from power consumption analysis process 520, so that power allocation process 540 can ensure that it is able to allocate necessary power as power allocation requests 580 and 582 are received.

Power supply monitoring process 550 monitors the available power from power supply 202 via the hardware associated with power supply 202. Power supply monitoring process 550 sends messages 552 to power consumption analysis process 520. These messages 552 may indicate the present power level, or may indicate either a decrease or an increase in the available power and the amount of the increase or decrease.

Power level messages 552 or power level change messages 552 may be sent on a regular basis, that is, at fixed time intervals which may be, for example and without limitation, on the order of seconds, milliseconds, or microseconds. Power level messages 552 or power level change messages 552 may also be sent when power supply monitoring process 550 determines that a significant change in the available power level has occurred, wherein a "significant change" may be defined as any change in the power level which could have a plausible potential to impact the operation of a lowest powered PRD 108 which may be connected to PSE 104.

Power level messages 552 or power level change messages 552 may also be sent when power supply monitoring process 550 determines that any change in the available power level has occurred wherein the change crosses a user-defined threshold value, or crosses a built-in or default threshold value, which may be defined as an absolute power level change or a percentage power level change. Power level messages 552 or power level change messages 552 may also be sent when power supply monitoring process 550 determines that a significant change has occurred in the available external power, where the criteria for a "significant change" may be analogous to any of the criteria defined above.

All the ongoing dynamic power management 314 processes 510, 520, 530, 540, 550 described in general terms above, and described in greater detail below, are real-time, ongoing monitoring and/or management processes. For example, port/PRD monitoring process 510 will continually monitor all ports 216 in real-time to determine attached PRDs 108, port electrical usage, that is, port current and voltage, port temperature, etc.

Similarly, power allocation process 540 will continually allocate and deallocate power to ports 216, based on messages from other processes, wherein such power allocations and deallocations occur frequently enough and quickly enough to provide a substantially real-time response to a changing network environment or changing electrical conditions. Similarly, interprocess messaging 552, 560, 562, 570, 572, 580, 582, 590, 592 will occur as frequently as is necessary, and as rapidly as is necessary, to ensure that power adjustments are made in a manner which is substantially real-time.

Criteria for a "substantially real-time" response by the method of ongoing dynamic power management 314 may include, for example and without limitation, ensuring that when a newly attached PRD 108 or newly powered-on PRD 108 requests power, and assuming sufficient power is available, that the PRD 108 is allocated power within a specified time frame, which may be on the order of minutes, seconds, milliseconds, microseconds, etc.; ensuring that when a PRD 108 is disconnected or powered off, or when a PRD 108 demonstrates a substantially sustained change in power consumption, whether an increase or a decrease in power consumption, that resulting change in power consumption is recognized and appropriate power management responses are made within a specified time frame, which may be on the order of minutes, seconds, milliseconds, microseconds, etc.; ensuring that when a PRD 108 exhibits a fault condition, such as a short circuit, in-rush, or thermal shutdown (TSD), that the fault condition is recognized, and an appropriate power management response is executed, within a specified time frame, which may be on the order of minutes, seconds, milliseconds, microseconds, etc.; ensuring that when the available power in the PSE, as determined by the power available from power supply 202, demonstrates a substantially sustained change, whether an increase or a decrease, that substantially sustained change in the level of power is recognized within a specified time frame, and an appropriate power management response is executed within a specified time frame, wherein the time frame may be on the order of minutes, seconds, milliseconds, microseconds, etc.; or ensuring that when the power available to PRDs 108, as determined a change in the TRP, demonstrates a substantially sustained change, whether an increase or a decrease in the TRP, that substantially sustained change in the TRP is recognized within a specified time frame and an appropriate power management response is executed within a specified time frame, wherein the time frame may be on the order of minutes, seconds, milliseconds, microseconds, etc.

Persons skilled in the relevant art(s) will appreciate that messages which may be sent back and forth between the above-described processes to implement the method of the present invention can be embodied in a variety of data structures and formats and can be communicated by a variety of methods including, for example and without limitation, interprocess communications mediated via an operating system or other software; interprocess communications mediated by ASICS; updates of records stored by various means and in various structures well known in the art; modifications of internally maintained databases; the setting or unsetting of flags, or the changing of numeric values or other data representations in various hardware registers; the setting or unsetting of flags, or the changing of numeric values or other data representations stored in various kinds of memory; and by a variety of other means of interprocess message communication well known to persons skilled in the relevant art(s).

FIG. 6 is another view of method 314B. Many features of FIG. 6 previously illustrated in FIG. 5 are repeated here and will not be described again in detail.

FIG. 6 shows in greater detail the steps involved in port/PRD monitoring process 510. In step 610, port/PRD monitoring process 510 discovers a newly connected PRD 108 or a newly turned on PRD 108, which is an unpowered PRD 226 which requires power. In response, port/PRD monitoring process 510 sends a message 560 to power consumption analysis process 520 indicating that additional power is being requested. Port/PRD monitoring process 510 also sends a power allocation request message 580 to power allocation process 540 requesting power for the newly connected PRD 226 or the newly turned on PRD 226. Finally, port/PRD monitoring process 510 will send information 562 regarding the real-time port PRD turn on or connection to queue maintenance process 530.

Based on these messages, power consumption analysis process 520 and/or power allocation process 540 can determine whether or not sufficient power is in fact available to allocate power to PRD 108. If power is allocated to the unpowered PRD 226, wherein it becomes powered PRD 224, power allocation process 540 can send a confirmation message 592 to queue maintenance process 530, in which case queue maintenance process 530 can add the powered PRD 224 to the power queue 354. If power consumption analysis process 520 and/or power allocation process 540 determine that insufficient power is available to power the unpowered PRD 226, power allocation process 540 can send a message 592 to queue maintenance process 530 indicating that the device has not been powered, in which case queue maintenance process 530 can add the unpowered PRD 226 to the priority queue 352 of devices which are awaiting available power.

In step 620, port/PRD monitoring process 510 monitors for any ports 216 which previously required power but no longer requires power. These are ports 216 for which a connected PRD 108 has either been disconnected or shut down, or for which a message has been received through a communications channel that the PRD 108 should be shut down, wherein the communications channel may be communications port 218, or the port 216 to which the PRD 108 is itself connected, or some other communications channel. In this case, port/PRD monitoring process 510 sends a message 560 to power consumption analysis process 520, which can then adjust its assessment of how much power is currently being used. In addition, port/PRD monitoring process 510 sends a message 580 to power allocation process 540 indicating that power is no longer required for the port 216, so that power allocation process 540 may deallocate power. Finally, port/PRD monitoring process 510 sends a message 562 to queue maintenance process 530 so that queue maintenance process 530 may remove PRD 108 from either the priority queue 352 or the power queue 354 as appropriate.

In step 630 of port/PRD monitoring process 510, power parameters for each PRD 108 are monitored on ports 216. These power parameters may include, for example and without limitation, the voltage V, the current I, and the temperature T. In one embodiment of the invention, these parameters are monitored only for ports 216 which have a powered PRD 224 connected. In another embodiment of the invention, these parameters are monitored for all ports 216 which have a PRD 108 connected, whether the PRD 108 is a powered PRD 224 or an unpowered PRD 226. The information collected is reported to power consumption analysis process 520 via the transfer of real-time port/PRD data 560. This information is used by power consumption analysis process 520 to determine how much power is being consumed by each port.

In addition, the data collected, and in particular the temperature data collected in step 630, is handed off to the processing involved in step 640, which determines if a fault condition exists on a port 216. Possible fault conditions which can be ascertained by monitoring the voltage, current, and temperature include short circuits, in rush and thermal shutdown (TSD). If port/PRD monitoring process 510 determines that a fault condition exists on the port 216, it sends messages 560, 562, 580 to power consumption analysis process 520, queue maintenance process 530 and power allocation process 580, respectively.

These messages 560, 562, 580 from port/PRD monitoring process 510 inform the other processes that the fault condition exists on the port and that the port should be shut down. In turn, power allocation process 540 attempts to shut down power to the port. Power allocation process 540 will also send messages 590 and 592 to power consumption analysis process 520 and queue maintenance process 530, respectively, confirming whether or not the power shutdown was successful. Power consumption analysis process 520 can then update its analysis of power being consumed, while queue maintenance process 530 can update the priority queue 352 and/or the power queue 354 as appropriate.

As noted above, port monitoring is a substantially real-time, ongoing process. In one embodiment of the present invention, monitoring of all ports by port/PRD monitoring process 510 may occur continually in parallel and simultaneously. In another embodiment of the present invention, monitoring of all ports may be sequential, wherein the port/PRD monitoring process repeatedly cycles through all ports in sequence. The sequence may be determined by a number of parameters including, for example and without limitation, the port numbering scheme, a user-assigned priority of the ports, a user-assigned priority of the attached PRDs, the last recorded power being consumed by the ports, the maximum power consumed by the ports, the minimum power consumed by the ports, or a time-average of the power consumed by the ports.

FIG. 7 is still another view of method 314B. Many features of FIG. 7 previously illustrated in FIG. 5 are repeated here and will not be described again in detail.

FIG. 7 shows in greater detail the steps involved in power consumption analysis process 520. In step 710, power consumption analysis process 520 determines the total power available from the PSE. This is based on information supplied by power supply monitoring process 550 via messages 552.

In step 720, power consumption analysis process 520 calculates the total reserve power (TRP) which is available. A detailed discussion has already been presented of various methods by which a TRP may be calculated, and one or more of those methods may be employed in step 720 of power consumption analysis process 520. It is noted in particular, however, that power analysis process 520 may sometimes employ a method based on a calculation of power presently consumed by powered PRDs 224 or maximum power consumed by powered PRDs 224 when only a small number of powered PRDs 224 are presented attached to PSE 104 and consuming power; while, on the other hand, the calculation of the total TRP may be based on an average power consumed by powered PRDs 224 when a greater number of powered PRDs 224 are consuming power from PSE 104.

In step 730 of power consumption analysis process 520, a minimum required reserve power (MRRP) is calculated. As discussed above, a MRRP may be determined in any of several ways including, for example and without limitation, a calculation of the maximum power that may be drawn by a powered PRD currently connected to the system, or based on a maximum power which may be drawn by a highest powered port of the PSE 104. Other algorithms can be employed as well to calculate a MRRP.

In step 740 of power consumption analysis process 520, a message is received from port/PRD monitoring process 510 indicating that a new PRD 108 has been connected to PSE 104 or that a PRD 108 that was previously connected to PSE 104 but was powered off has now been turned on, so that PRD 108 is an unpowered PRD 226. Step 740 then determines if enough power is available to power unpowered PRD 226. This determination may be made according to the following algorithm:

First, step 740 calculates a post-allocation reserve power, or PARP, wherein:

PARP=TRP−power required by the unpowered PRD

This PARP indicates how much power would remain available if power were allocated to unpowered PRD 226. Finally a determination is made:

If PARP>=MRRP, then allocate power to unpowered PRD 226, wherein unpowered PRD 226 becomes a powered PRD 224.

If PARP<MRRP, then do not allocate power to unpowered PRD 226.

In other words, if the power allocation to the unpowered PRD 226 would leave a reserve power which is greater than or equal to the MRRP, proceed with the power allocation. If the power allocation to unpowered PRD 226 would leave a reserve power which is less than the MRRP, then do not proceed with the power allocation to unpowered PRD 226.

If a determination is made that sufficient power is available, then a message 572 is sent to power allocation process 540 telling power allocation process 540 to allocate power to unpowered PRD 226. Power allocation process 540 may send a message 592 to queue maintenance process 530 indicating that the PRD 108 has been powered on, enabling queue maintenance process 530 to add PRD 108, which is now a powered PRD 224, to power queue 354.

On the other hand, if the determination is made that insufficient power is available, then a message 570 is sent to queue maintenance process 530 instructing queue maintenance process 530 to add the unpowered PRD 226 to the priority queue 352.

In an alternative embodiment of the present invention, the step 740 of determining whether or not there is enough power available to power on a newly attached or newly turned on PRD 108, may not be made as part of the power consumption analysis process 520 at all. Instead, this analysis and determination may be made as part of power allocation process 540.

In step 750 of power consumption analysis process 520, a determination is made of the minimum power required by each currently powered PRD 224. In one embodiment of the present invention, this determination is based on the monitored powered parameters, such as the current (I) and the voltage (V) which had been reported in messages 560 from port/PRD monitoring process 510. In one embodiment of the present invention, the power is calculated as the current which is currently being consumed by the powered PRD 224 multiplied by the voltage which is currently being consumed by the powered PRD 224, that is, $P=V*I$.

In an alternative embodiment of the present invention, the minimum power requirement may be based on an average of the power which has been calculated over a period of time, or may be based on a peak power consumption which has been observed over a period of time. In any of these cases, the actual numerical calculation may again be made by multiplying the current consumed at the port 216 multiplied by the voltage consumed at the port 216. In an alternative embodiment of the present invention, the power calculation may be based on current times voltage times some constant, that is, $P=constant*V*I$, or may be based on some other calculation or formula involving the voltage and the current which is detected at port 216.

In step 760 of power consumption analysis process 520, a recalculation is made of the TRP when power is allocated to a PRD 108, or when the power allocation to a powered PRD 224 is increased. In step 770 of the power consumption analysis process 520, a recalculation is made of the TRP when a PRD 108 no longer requires power or when the power allocation to a powered PRD 224 is decreased. In the event that power is allocated to a PRD, then typically in step 760 the TRP will decrease compared to its previous value; whereas, when power is no longer allocated to a PRD 108, or when the power allocated to a powered PRD is decreased, then typically in step 770 the TRP will increase compared to its previous value. In all cases, the recalculation of the TRP may be made according to a method or choice of methods as already described above.

FIG. 8 is still another view of method 314B. Many features of FIG. 8 previously illustrated in FIG. 5 are repeated here and will not be described again in detail.

FIG. 8 shows in greater detail the steps involved in queue maintenance process 530, which is depicted here with its associated priority queue 352 and power queue 354.

As discussed above, the order of unpowered PRDs 226 in priority queue 352 may be determined by one factor or a combination of factors which may include, for example and without limitation, a PRD power classification stored in an MIB 222 in an unpowered PRD 226, or a communications port number of the communications port of the PSE 104 to which an unpowered PRD 226 is connected, or a preassigned priority value of the communications port to which an unpowered PRD 226 is connected, or a time order in which an unpowered PRD 226 was connected to the PSE 104.

In one embodiment of the present invention, the order of unpowered PRDs 226 in the priority queue 352 is determined by at least one of the preassigned priority value of the communications port 216 to which each unpowered PRD 226 is attached, or the communications port number of the communications port 216 to which each unpowered PRD 226 is attached, or the PRD power classification of each unpowered PRD 226 in the queue 352. In the event that two or more unpowered PRD 226 have the same priority based on these aforementioned criteria, they may be assigned an order in the priority queue based on the time order in which the unpowered PRD 226 were connected to PSE 104.

In an alternative embodiment, the PRD priority in the priority queue may be determined only by the communications port number of the communications port 216 to which each unpowered PRD 226 is connected.

Regarding the power queue 354, which stores a list of all currently powered PRDs 224, the ordering of powered PRDs 224 in power queue 354 may be determined by one factor or a combination of factors which may include, for example and without limitation, the power classification of each powered PRD 224, a preassigned priority value of the communications port 216 to which each powered PRD 224 is connected, the communications port number of the communications port 216 to which each powered PRD 224 is connected, the time when the powered PRD 224 was connected to communications port 216, and/or a user designated PRD importance as indicated above.

For both the priority queue 352 and the power queue 354, user assigned values for priority factors, such as the user-designated PRD importance or a preassigned priority value of a communications port, may be communicated to the PSE 104 from a computer or other external control device via communications port 218.

Queue maintenance process 530 operates according to the following steps:

In step 820, when a new PRD 108 is added as indicated by a message 562 from port/PRD monitoring process 510, if there is insufficient power available to power the PRD as indicated by a message 592 from power allocation process 540, then the queue maintenance process 530 adds the new PRD 108 to the priority queue 352 in an order determined by priority criteria previously discussed.

Step 830 depends on power availability messages 570 delivered to queue maintenance process 530 from power consumption analysis process 520. In step 830, based on the power availability messages 570 and based on an analysis of the power required by devices in the priority queue 352, queue maintenance process 530 determines that certain presently unpowered PRDs 226 should receive power.

The determination as to exactly which unpowered PRDs 226 may be allocated power may be based both on the order of the PRDs in the priority queue 352 and based on the amount of power required for an unpowered PRD 226. For example, if an unpowered PRD 226 is at the head of queue 352, but insufficient power is available to power that unpowered PRD 226, a request will not be made to power the unpowered PRD 226. Queue maintenance process 530 will then evaluate the second, third, and later unpowered PRDs 226 listed in priority queue 352, typically in order of descending priority.

This evaluation of unpowered PRDs 226 in the queue 352 will continue until queue maintenance process 530 identifies an unpowered PRD 226, if one exists, which only requires a power allocation which is less than or equal to the power presently available, based on the information delivered by power consumption analysis process 520. The calculations involved are typically analogous to those employed by power consumption analysis process 520 to determine whether or not power may be allocated to a PRD 108, as already described above, and the discussion will not be repeated here.

Having identified a PRD 108 which can be allocated power based on the available power, in one embodiment of the present invention a request 582 is sent to power allocation process 540 to allocate power to the unpowered PRD 226. Power allocation process 540 may confirm via message 592 that power has been successfully allocated to the unpowered PRD 226, wherein the PRD becomes a powered PRD 224.

In step 840, once confirmation is received via message 592 from power allocation process 540 that the device has been powered, the PRD is removed from priority queue 352 and optionally, in one embodiment of the invention, added to power queue 354.

In step 850, in one embodiment of the present invention, as PRDs 108 are added to priority queue 352 and removed from priority queue 352, and similarly as PRDs 108 are added to power queue 354 and removed from power queue 354, queue maintenance process 530 reorders the PRDs in the queue based on priority criteria as discussed above.

In an alternative embodiment of the present invention, reordering of the PRDs 108 in queue(s) 352, 354 is not necessary, as the insertion process to insert a PRD 108 in priority queue 352 or in power queue 354 employs an algorithm which automatically determines the appropriate placement of the PRD 108 in a queue 352, 354, and further automatically inserts the PRD 108 in the appropriate location in the queue. For example, a queue 352, 354 may be implemented as a link list, which facilitates easy insertion of a PRD 108 anywhere in the queue according to computational methods and memory management methods which are well known to those skilled in the relevant art(s).

In one embodiment of the present invention, in step 860 queue maintenance process 530 maintains the power queue 354. The power queue exists in the event that there is a decrease in power delivered by PSE 104, or in the event that an overall increase in simultaneous power demanded by powered PRDs 224 means that there is no longer sufficient power to support all of the currently powered PRDs 224. In that event, a determination must be made as to which devices to deallocate power from.

As messages 592 are received from power allocation process 540, indicating that unpowered PRDs 226 have become powered PRDs 224, queue maintenance process 530 adds these devices to the power queue 354. Queue maintenance process 530 maintains an appropriate priority order of the priority queue 354 according to priority criteria as already discussed above. As discussed above, in one embodiment of the present invention, the priority queue 354 may be maintained as a link list or similar data structure wherein powered PRDs 224 added to power queue 354 may be added at the appropriate point in the list, including a designated point in the middle of the list, so that no separate reordering step or process is necessary.

In step 870, if a message 570 is received from power consumption analysis process 520 that the available power has dropped, queue maintenance process 530 determines which presently powered PRDs 224 should be deallocated power. Persons skilled in the art will recognize that algorithms to select which device or devices should be deallocated power can be employed based both on the order in which devices are listed in power queue 354, and also on the power requirements of the devices listed in power queue 354.

Powered PRDs 226 may be preferably deallocated power in such a manner that those devices of lowest priority are deallocated first while still ensuring that sufficient power is available to power those devices of highest priority. Once a decision has been made by queue maintenance process 530 to deallocate power from a device, messages 582 are sent to power allocation process 540 requesting the deallocation from designated PRDs 108. Power allocation process 540 responds with messages 592 indicating whether or not power has been successfully deallocated. Queue maintenance process 530 responds by adding and removing PRDs 108 from priority queue 352 and power queue 354 as appropriate, and if necessary reordering devices in those queues as appropriate. Messages are also sent from power allocation process 540 to power consumption analysis process 520 indicating that power has been deallocated.

FIG. 9 is still another view of method 314B. Many features of FIG. 9 previously illustrated in FIG. 5 are repeated here and will not be described again in detail.

FIG. 9 shows in greater detail the steps involved in power allocation process 540.

In step 910, in one embodiment of the present invention, a message 580 may be received by power allocation process 540 from port/PRD monitoring process 510 indicating that a new PRD 108 has been connected to PSE 104, or that a previously connected PRD 108 that was powered off is now powered on. If a message or messages 572 from power consumption analysis process 520 indicate that sufficient power is available to power PRD 108, then power allocation process 540 allocates power to the PRD 108. In an alternative embodiment of the present invention, power allocation process 540 itself makes the determination as to whether there is sufficient power available to power the PRD 108, using methods analogous to those described above for power consumption analysis process 520.

If sufficient power is available, power allocation process 540 allocates the power to PRD 108. The detailed steps involved in power allocation, including any necessary, associated data communication with PRD 108, may conform to protocols appropriate to the power delivery technology employed by PSE 104, such as the power allocation protocols indicated by IEEE standard 802.3af. Having allocated the power, power allocation process 540 sends a message 592 to queue maintenance process 530 and also sends a message 590 to power consumption analysis process 520.

In step 920, power allocation process 540 adjusts the power allocated to currently powered PRDs 224 so that only the minimum required power is delivered to each currently powered PRD. Power allocation process 540 is able to do this based on power availability messages and power analysis messages provided by power consumption analysis process 520, as already described above.

In step 930, power allocation process 540 receives messages 582 from queue maintenance process 530 requesting that power be allocated to currently unpowered PRDs 226. In one embodiment of the present invention, power allocation process 930 may use data contained in a message or messages 572 from power consumption analysis process 520 to first confirm that sufficient power is available for the allocation. In an alternative embodiment of the present invention, power allocation process 540 itself makes the determination as to whether there is sufficient power available to power the PRD 108. Upon having made the confirmation, power allocation process 540 allocates power to the currently unpowered PRD 226 wherein the PRD 108 becomes a powered PRD 224.

Power allocation process 540 then sends a message 590 to power consumption analysis process 520 and also sends a message 592 to queue maintenance process 530, wherein both messages indicate that power has been allocated.

Finally, in one embodiment of the present invention, in step 940 power allocation process 540 monitors for requests 580 from port/PRD monitoring process 510 or queue maintenance process 530 to deallocate power from a port. As discussed above, these requests may come for a variety of reasons including, for example and without limitation, a device being disconnected from a port, a fault condition being detected on a port, a decrease in overall power availability, or for other reasons.

Having received the message to deallocate power to a port, power allocation process 540 deallocates power from the port. The detailed steps involved in power deallocation, including any necessary, associated data communication with PRD 108, will conform to protocols appropriate to the power delivery technology employed by PSE 104, such as the power allocation protocols indicate by IEEE standard 802.3af. Having deallocated the power, power allocation process 540 sends a message 592 to queue maintenance process 530 and also sends a message 590 to power consumption analysis process 520 indicating that power was deallocated from the PRD 108.

V. Conclusion

As will be appreciated by persons skilled in the relevant art(s), the processes described here represent only one possible embodiment of the present invention. Many of the steps described could, in alternative embodiments of the present invention, be allocated differently among the different processes described. In addition, additional processes, or a different organization of the various steps of the method into processes of different structure, could still implement the overall effect and intent of the method.

Finally, it will be understood that the actual process of allocating power or deallocating power is accomplished through at least one of the hardware, software and firmware embodied in the PSE 104, and in particular in some embodiments of the present invention, in the PSEPM 204 which handles the power management protocols mandated by the 802.3af standard. Therefore, the method of the present invention in an exemplary embodiment is to have the algorithms or processes of the invention send messages to PSEPM 204 for purposes of controlling the actual power at the ports 216 and/or for obtaining power information and related data from the ports 216. In an alternative embodiment, the protocols and methods to ensure compliance with 802.3af may be handled through controller 206 which controls ports 216. Controller 206, in turn, is controlled by the algorithms or processes of the present invention.

What is claimed is:

1. In a communications system having power source equipment (PSE) and a plurality of power requiring devices (PRD), the PSE providing power to the PRDs over the communications system, a method of power management comprising:

monitoring a power consumption of at least one PRD;

dynamically adjusting the power allocated to the at least one PRD based on the monitored power consumption of the at least one PRD;

maintaining a power queue of PRDs which are connected to the communications system, wherein the PRDs in the power queue are currently powered and wherein the PRDs in the power queue are ranked in an order of priority;

determining that there is a decrease in the maximum power supplied by the PSE;

deallocating power from PRDs in the power queue, wherein a PRD which ranks lowest in priority in the power queue is deallocated first, and wherein PRDs from which power is deallocated are deallocated PRDs, and wherein power is deallocated from PRDs in the power queue until the maximum power supplied by the PSE is at least sufficient to supply power to the powered PRDs;

assigning the deallocated PRDs to a priority queue,
determining a total reserve power currently available from the PSE as a maximum power supplied by the PSE minus an average of the power supplied over a period of time to all PRDs which are currently powered;
allocating power to an unpowered PRD in the priority queue while the total reserve power is greater than or equal to a minimum required reserve power, wherein the unpowered PRD becomes a powered PRD; and
removing the powered PRD from the priority queue and placing the powered PRD in the power queue,
wherein the priority of the unpowered PRD in the priority queue is based on a time order in which the PRD is connected to the communications system.

2. The method of claim 1, further comprising allocating power to the at least one PRD when the communications system is first powered up based on at least one of a predefined power allocation, a PRD power classification, or a maximum power which can be allocated to a communications port of the communications system to which the PRD is connected.

3. The method of claim 1, further comprising
checking for a PRD that previously required power but no longer requires power, and no longer allocating power to the PRD.

4. The method of claim 3, wherein the checking step comprises at least one of:
(i) determining that a PRD that was connected to the communications system is no longer connected to the communications system;
(ii) determining that a PRD that is connected to the communications system and was powered on is now powered off; and
(iii) checking for a fault condition in a communications port of the communications system to which the PRD is connected.

5. The method of claim 4, wherein the checking step comprises monitoring the communications port for fault conditions including at least one of short circuits, in-rush, and thermal shutdown (TSD).

6. The method of claim 1, wherein dynamically adjusting further comprises dynamically determining a minimum necessary power required by the at least one PRD, and allocating the minimum necessary power to the at least one PRD, and
wherein the minimum necessary power is determined by applying a law of averages based on the power consumption of the PRD over a period of time.

7. The method of claim 1, wherein the maintaining step comprises listing the PRDs in the priority queue in order of a predetermined PRD priority;
wherein the PRD priority is determined by a set of priority elements, the set of priority elements including at least one of:
a PRD power classification;
a communications port number of a communications port of the communications system to which the PRD is connected; and
a preassigned priority value of the communications port to which the PRD is connected.

8. The method of claim 1, wherein the determining step comprises calculating the total reserve power as a maximum power supplied by the PSE minus a sum of the power currently being supplied to all PRDs.

9. The method of claim 1, wherein the allocating step comprises setting the minimum required reserve power equal to a maximum power that can be used by at least one of a highest powered PRD connected to the PSE or a highest powered communications port which is part of the communications system.

10. The method of claim 1, wherein the communications system is a Power-over-Ethernet system; and
wherein power is delivered from the PSE to the PRD via a communications port of the Power-over-Ethernet system.

11. The method of claim 1, wherein PRDs in the power queue are ranked in priority according to a PRD importance, wherein the PRD importance is determined by a set of priority elements, the set of priority elements including at least one of:
a power classification of each powered PRD;
a preassigned priority value of the communications port to which each powered PRD is connected;
a communications port number of the communications port to which each powered PRD is connected;
and
a user-designated PRD importance.

12. The method of claim 1, wherein the monitoring step comprises monitoring at least one of a port current, a port voltage, and a port temperature at a communications port where the PRD is connected.

13. In a communications system having power source equipment (PSE), a plurality of communications ports, and a plurality of power requiring devices (PRDs), the PSE providing power to each power requiring device (PRD) over a corresponding one of the communications ports, wherein each PRD which is currently powered via a corresponding communications port is a powered PRD, wherein each communications port with a powered PRD connected to it has a communications port power consumption, and wherein the PSE supplies a maximum power, a method of power management comprising:
allocating power to each PRD when the communications system is first powered up;
monitoring the communications port power consumption for each port which currently has a powered PRD connected;
dynamically adjusting the power allocated to at least one powered PRD based on the monitored communications port power for the communications port to which the at least one powered PRD is connected;
maintaining a power queue of PRDs which are connected to the communications system, wherein the PRDs in the power queue are currently powered and wherein the PRDs in the power queue are ranked in priority in an order of priority;
determining that there is a decrease in the maximum power supplied by the PSE;
deallocating power from a PRD in the power queue, wherein the PRD which ranks lowest in the power queue is deallocated first, and wherein PRDs from which power is deallocated are deallocated PRDs, and wherein power is deallocated from PRDs in the power queue until the maximum power supplied by the PSE is at least sufficient to supply power to the powered PRDs;
assigning the deallocated PRD to a priority queue of power requiring devices (PRDs) which are connected to the communications system, wherein the PRDs in the priority queue are not currently powered,
determining a total reserve power currently available from the PSE as a maximum power supplied by the PSE minus an average of the power supplied over a period of time to all PRDs which are currently powered:
allocating power to an unpowered PRD in the priority queue while the total reserve power is greater than or equal to a minimum required reserve power, wherein the unpowered PRD becomes a powered PRD; and removing the powered PRD from the priority queue and placing the powered PRD in the power queue, wherein the priority of the unpowered PRD in the priority queue is based on a time order in which the PRD is connected to the communications system.

14. The method of claim 13, further comprising checking for a communications port that previously required power but no longer requires power, and no longer allocating power to the communications port, wherein checking for the communications port comprises at least one of:

determining that the PRD that was connected to the communications port is no longer connected to the communications port;

determining that the PRD that is connected to the communications port and was powered on is now powered off; and checking for a fault condition in the communications port, wherein the fault condition includes at least one of short circuits, in-rush, and thermal shutdown (TSD).

15. The method of claim 13, wherein dynamically allocating further comprises dynamically determining a minimum necessary power required by the at least one powered PRD, and allocating the minimum necessary power to the at least one powered PRD, and wherein the minimum necessary power is determined by applying a law of averages based on the power consumption of the PRD over a period of time.

16. The method of claim 13, wherein the maintaining step comprises listing the unpowered PRDs in the priority queue in order of a descending PRD priority, wherein the PRD priority is determined by a set of priority elements, the set of priority elements including at least one of:

a power classification of each PRD;

a preassigned priority value of the communications port to which each unpowered PRD is connected; and a communications port number of the communications port to which each unpowered PRD is connected.

17. The method of claim 16, wherein a set of unpowered PRDs having the same priority based on the set of priority elements are assigned to the priority queue based on a time order in which each unpowered PRD in the set of unpowered PRDs was connected to its corresponding communications port.

18. The method of claim 13, wherein the determining step comprises calculating the total reserve power as a maximum power supplied by the PSE minus a sum of the power currently being supplied to all PRDs.

19. The method of claim 13, wherein PRDs in the power queue are ranked in priority according to a PRD importance, wherein the PRD importance is determined by a set of priority elements, the set of priority elements including at least one of:

a power classification of each powered PRD;

a preassigned priority value of the communications port to which each powered PRD is connected;

a communications port number of the communications port to which each powered PRD is connected; and a user-designated PRD importance.

20. The method of claim 13, wherein the allocating step comprises allocating power to the PRDs based on at least one of a predefined power allocation, a PRD power classification, or a maximum power which can be allocated to each communications port to which each PRD is connected.

21. The method of claim 13, wherein the monitoring step comprises monitoring at least one of a port current, a port voltage, and a port temperature at the port where the PRD is connected and powered.

* * * * *

UNITED STATES PATENT AND TRADEMARK OFFICE
CERTIFICATE OF CORRECTION

PATENT NO. : 8,352,754 B2
APPLICATION NO. : 11/979919
DATED : January 8, 2013
INVENTOR(S) : David Kun Chin Page 1 of 1

It is certified that error appears in the above-identified patent and that said Letters Patent is hereby corrected as shown below:

In the Claims

Column 32, line 65, replace "powered:" with --powered;--.

Signed and Sealed this
Fourteenth Day of May, 2013

Teresa Stanek Rea
*Acting Director of the United States Patent and Trademark Office*